United States Patent
Zou et al.

(10) Patent No.: US 8,477,444 B1
(45) Date of Patent: Jul. 2, 2013

(54) CLOCK FREQUENCY SYNCHRONIZATION FOR MAGNETIC RECORDING DEVICE

(75) Inventors: Qiyue Zou, San Jose, CA (US); Xueshi Yang, Cupertino, CA (US); Gregory Burd, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 523 days.

(21) Appl. No.: 12/786,242

(22) Filed: May 24, 2010

Related U.S. Application Data

(60) Provisional application No. 61/261,555, filed on Nov. 16, 2009, provisional application No. 61/239,305, filed on Sep. 2, 2009, provisional application No. 61/181,502, filed on May 27, 2009.

(51) Int. Cl.
*G11B 5/09* (2006.01)
*G11B 5/596* (2006.01)

(52) U.S. Cl.
USPC .............. 360/51; 360/77.08; 360/78.09

(58) Field of Classification Search
None
See application file for complete search history.

(56) References Cited

U.S. PATENT DOCUMENTS

| | | | |
|---|---|---|---|
| 8,031,428 B1 * | 10/2011 | Rutherford | 360/75 |
| 2008/0304173 A1 * | 12/2008 | Albrecht et al. | 360/51 |
| 2010/0118426 A1 * | 5/2010 | Vikramaditya et al. | 360/51 |

* cited by examiner

*Primary Examiner* — Regina N Holder

(57) ABSTRACT

The present disclosure includes systems and techniques relating to control of magnetic recording devices, such as disk drives. Systems and techniques include generating timing data based on a clock signal and a waveform produced by a head operated with respect to a rotating recording medium and the clock signal, determining model parameters based on the timing data to model deterministic disturbances associated with the rotating recording medium, predicting a frequency offset by a model-based technique for the compensation of the deterministic disturbances between two servo wedges, predicting a frequency offset associated with one or more nondeterministic disturbances by a loop filter, determining a clock adjustment based on the predicted deterministic and nondeterministic frequency offsets, and adjusting a clock frequency to read or write data within the area.

20 Claims, 12 Drawing Sheets

CLOCK FREQUENCY SYNCHRONIZATION FOR MAGNETIC RECORDING DEVICE

CROSS REFERENCE TO RELATED APPLICATIONS

This application claims the benefit of the priority of U.S. Provisional Application Ser. No. 61/181,502, filed May 27, 2009 and entitled "Write-Clock Frequency Synchronization Architecture/Method for Bit-Patterned Media Recording," and the benefit of the priority of U.S. Provisional Application Ser. No. 61/239,305, filed Sep. 2, 2009 and entitled "A Technique for Estimating the Repeatable Run-Out (RRO) Errors in Magnetic Recording Systems," and the benefit of the priority of U.S. Provisional Application Ser. No. 61/261,555, filed Nov. 16, 2009 and entitled "Write-Clock Frequency Synchronization Architecture for Bit-Patterned Media Recording." The disclosures of the above applications are incorporated herein by reference in their entirety.

BACKGROUND

Storage devices such as a magnetic medium based disk drive can store data on circular, concentric tracks on a disk surface. A read-write head retrieves and records data on a magnetic layer of a rotating disk as the head flies on a cushion of air over the disk surface. When retrieving data, magnetic field variations are converted into an analog electrical signal, the analog signal is amplified, converted to a digital signal, and interpreted. To guarantee the quality of the information saved on and read back from the disk, the read-write head should be accurately positioned at the center of the track during both writing and reading, and the speed or frequency of read and write should be accurately controlled with respect to the rotating disk. A closed-loop control system can respond to servo information embedded in dedicated portions of a track on the recording surface to accurately position the head and synchronize the timing of drive operations such as read and write operations.

The servo information defines the position of the data tracks and is written with great accuracy in order for a closed-loop control system to operate properly. Typically, servo information is written on a disk surface as a radially extending set of spokes or wedges, e.g., servo wedges. In some implementations, a portion of a servo wedge at a particular track location can include a synchronization field, index mark, a gray coded track number, and two or more fine-positioned offset bursts configured in an echelon across the track. Head positioning relative to a track center can be determined and corrected, if necessary, by reading and noting the respective amplitudes and timings of the offset bursts.

SUMMARY

The present disclosure includes systems and techniques for operating a recording device, such as a disk drive.

According to an aspect of the described systems and techniques, methods for operating a disk drive can include can include generating timing data based on a clock signal and a waveform produced by a head operated with respect to a rotating recording medium and the clock signal, determining model parameters based on the timing data to model deterministic disturbances associated with the rotating recording medium, predicting a frequency offset by model-based methods for the compensation of the deterministic disturbances between two consecutive servo wedges, predicting frequency offset associated with random and nondeterministic disturbances by a loop filter, and determining clock frequency adjustment based on the predicted deterministic and nondeterministic frequency offsets. The rotating recording medium can include multiple servo wedges arranged on multiple tracks. Timing data can include information based on a measurement of clock pulses of the clock signal between consecutive servo wedges as indicated by the waveform. Other implementations can include corresponding systems, apparatus, and computer program products.

These and other implementations can include one or more of the following features. Determining the clock frequency adjustment can include determining multiple adjustments for multiple adjacent sub-regions between two consecutive servo wedges. A disk drive system can determine clock frequency adjustments for the sub-regions, respectively. Adjusting the clock frequency can include performing multiple adjustments between two consecutive servo wedges, respectively, during a passage of the head over the adjacent sub-regions. Implementations can combine outputs from a model-based predictor and a loop filter to provide clock frequency updates.

Determining the deterministic model parameters based on the timing data can include determining coefficients of sinusoidal harmonics associated with the deterministic disturbances. Model parameters can include amplitudes and phases of respective sinusoidal harmonics. Model parameters can include repeatable timing error component measured at fixed points on a track, e.g., the timing error components at each servo wedge. Implementations can include obtaining one or more frequency adjustments produced by a phased-locked loop operated on the timing data. Implementations can include operating a phased-locked loop on the timing data to produce frequency adjustments. Implementation can include using sinusoidal functions with associated model parameters to compute repeatable run-out components for areas between consecutive servo wedges on a track. Implementations can include performing an interpolation of the repeatable run-out components at servo wedges to obtain repeatable run-out components for areas between consecutive servo wedges on the track.

According to another aspect of the described systems and techniques, methods for operating a disk drive can include generating timing data based on a clock signal and a waveform produced by a head operated with respect to a rotating recording medium and the clock signal, determining model parameters based on the timing data to model deterministic disturbances associated with the rotating recording medium, determining a frequency offset based on one or more of the model parameters to predict and compensate for one or more of the deterministic disturbances in an area of the rotating recording medium situated between two servo wedges, determining a clock adjustment based on the frequency offset, and adjusting the clock signal based on the clock adjustment to read or write data within the area.

According to another aspect of the described systems and techniques, methods for operating a disk drive can include generating timing data based on a clock signal and a waveform produced by a head operated with respect to a magnetic rotating recording medium and the clock signal, the rotating recording medium including multiple servo wedges arranged on multiple tracks, determining model parameters based on the timing data to model and predict deterministic disturbances associated with the rotating recording medium, determining a first frequency offset, based on one or more of the model parameters, to compensate for one or more of the deterministic disturbances in an area of the rotating recording medium situated between two servo wedges, determining a second frequency offset to compensate for one or more nondeterministic disturbances in the area, determining a clock adjustment based on the first frequency offset and the second frequency offset, and adjusting a clock frequency based on the clock adjustment to read or write data within the area. Determining the second frequency offset can include using a frequency adjustment produced by a loop filter operated on the timing data. Other implementations can include corresponding systems, apparatus, and computer program products.

These and other implementations can include one or more of the following features. Determining the clock adjustment can include determining multiple clock frequency adjustments for multiple adjacent sub-regions of a region on a track, where the region is situated between a first servo wedge on the track and a second servo wedge on the track. In some implementations, the clock frequency adjustments are determined for the sub-regions, respectively. Adjusting the clock frequency can include performing multiple adjustments to the clock frequency based on the clock frequency adjustments, respectively, during a passage of the head over the adjacent sub-regions. Determining model parameters based on the timing data can include using one or more sinusoidal functions to model the one or more deterministic disturbances. The model parameters can include one or more sinusoidal harmonic amplitude parameters and one or more sinusoidal harmonic phase parameters. Determining model parameters based on the timing data can include using one or more periodic functions to model the one or more deterministic disturbances. The model parameters can include two or more periodic timing components associated with two or more servo wedges, respectively. Determining model parameters based on the timing data can include using one or more frequency adjustments produced by the loop filter. Implementations can include updating the model parameters based on one or more frequency adjustments produced by the loop filter.

Determining the first frequency offset can include determining repeatable run-out components along a track of the rotating recording medium by using a sinusoidal function model with one or more estimated model parameters. Determining the first frequency offset can include performing an interpolation of one or more periodic timing components at servo wedges for areas between consecutive servo wedges on the track.

Determining the first frequency offset can include identifying a sub-region of a region on the track situated between a first servo wedge on the track and a second servo wedge on the track. The region can include multiple sub-regions. Determining the first frequency offset can include predicting a repeatable run-out frequency offset for the identified sub-region based on the interpolation.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiment can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a personal digital assistant (PDA), a mobile computer, a digital camera), a general purpose data processing apparatus such as a computer, or combinations of these.

Systems and apparatuses can include circuitry configured to generate timing data based on a clock signal and a waveform produced by a head operated with respect to a magnetic rotating recording medium and the clock signal, the rotating recording medium including multiple servo wedges arranged on multiple tracks. Systems and apparatuses can include controller circuitry configured to determine model parameters based on the timing data to model deterministic disturbances associated with the rotating recording medium, determine a first frequency offset based on one or more of the model parameters to predict and compensate for one or more of the deterministic disturbances in an area of the rotating recording medium situated between two servo wedges, and determine a second frequency offset to compensate for one or more non-deterministic disturbances in the area. Systems and apparatuses can include circuitry configured to determine a clock adjustment based on the first frequency offset and the second frequency offset. Systems and apparatuses can include circuitry configured to adjust a clock frequency based on the clock adjustment.

Systems and apparatuses can include a magnetic rotatable recording medium that includes multiple servo wedges arranged on multiple tracks, a drive head to read and write data to the rotatable recording medium, a motor to rotate the rotatable recording medium, and a time stamp circuit configured to generate timing data based on a clock signal and a waveform produced by the drive head operated with respect to the rotatable rotating recording medium and the clock signal. Systems and apparatuses can include a controller configured to determine model parameters based on the timing data to model deterministic disturbances associated with the rotatable recording medium, determine a first frequency offset based on one or more of the model parameters to predict and compensate for one or more of the deterministic disturbances in an area of the rotatable recording medium situated between two servo wedges, and determine a second frequency offset to compensate for one or more nondeterministic disturbances in the area. Systems and apparatuses can include a frequency adjustment calculator configured to determine a clock adjustment based on the first frequency offset and the second frequency offset. Systems and apparatuses can include circuitry configured to adjust a clock frequency based on the clock adjustment.

Details of one or more implementations are set forth in the accompanying drawings and the description below. Other features, objects, and advantages may be apparent from the description and drawings, and from the claims.

DRAWING DESCRIPTIONS

Like reference symbols in the various drawings indicate like elements.

DETAILED DESCRIPTION

Bit-patterned media (BPM) technologies can increase the capacity of magnetic storage to beyond 1 Tbit/in$^2$. In today's conventional continuous media, for example, recorded bits are composed of many independent nanometer-scale grains in a film of magnetic alloy. Increasing bit density for greater storage capacity may require increasingly smaller grain sizes. However, smaller grain sizes on a continuous media may increase superparamagnetic effects to the point where the effects become a major factor that prevents further increases of storage density.

Bit-patterned media have separately defined bit positions. In some implementations, BPM include magnetic film that contains an ordered array of uniform islands where each bit occupies a single magnetic island. Such a bit arrangement may achieve better thermal stability than continuous media. Because the position of each bit is predefined by the media, BPM technology may require greater write-clock frequency and phase accuracy than continuous media. For example, loss in synchronization between the write clock pulses and the bit islands may cause catastrophic errors that are difficult to detect and correct.

Figure 1:
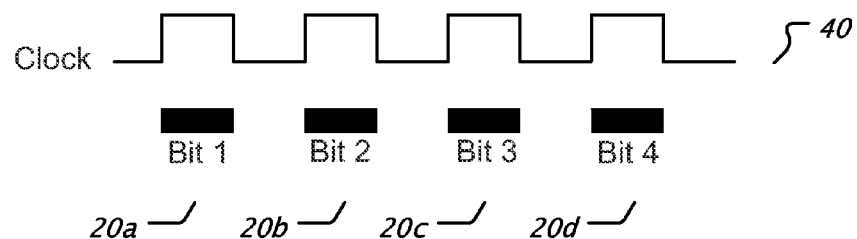
FIG. 1 shows an example of an alignment of clock signal pulses with bit cells on a bit-patterned medium.

FIG. 1 shows an example of an alignment of clock signal pulses with bit cells on a bit-patterned medium. A recording medium such as a bit-patterned medium includes multiple bit islands called bit cells 20a, 20b, 20c, 20d. A bit-patterned medium can arrange the bit cells 20a, 20b, 20c, 20d to form a concentric track about a center of the medium. The medium can include multiple tracks with bit cells. A disk drive system can use a clock signal 40 to synchronize drive operations, such as reading or writing, with the bit cells 20a, 20b, 20c, 20d. For example, the disk drive system can use pulses of the clock signal 40 to control writing data to or reading from the bit cells 20a, 20b, 20c, 20d.

Deterministic disturbances such as repeatable run-out (RRO) errors and non-deterministic disturbances such as non-repeatable run-out (NRRO) errors can cause clock synchronization errors. Various examples of deterministic disturbances include disk eccentricity, servo RRO errors, and spindle commutation harmonics, e.g., harmonics of a spindle frequency. Sources of non-deterministic disturbances include phase noise and transient events such as a physical tap on a drive and fluctuations in power that alter a rate of rotation. In some cases, RRO errors are a dominate source of write-clock timing errors. RRO errors typically cause the same timing error pattern each time a drive head passes over the same portion of the track, whereas, NRRO errors are generally random and causes different error patterns for the same portion of the track.

The subject matter described herein includes details and implementations of examples of write-clock frequency synchronization technologies for various recording media such as BPM. Write-clock frequency synchronization technologies include a write-clock frequency synchronization technique to operate disk drives that require high performance timing control for writing operations, such as BPM based disk drives. Potential advantages of the disk drive synchronization technologies include compensating for errors including RRO and NRRO errors in an optimized manner to provide a more accurate frequency synchronization for the write operation. Synchronization techniques and systems can include applying one or more statistical signal processing algorithms to predict the frequency offset of a clock, and adjusting the clock frequency to minimize the errors. Synchronization techniques can model deterministic frequency fluctuations. Disk drive synchronization systems can include one or more synchronization techniques implemented in a disk drive's firmware and one or more synchronization techniques implemented in dedicated hardware circuitry such as phase-locked loop (PLL) circuitry.

Figure 2:
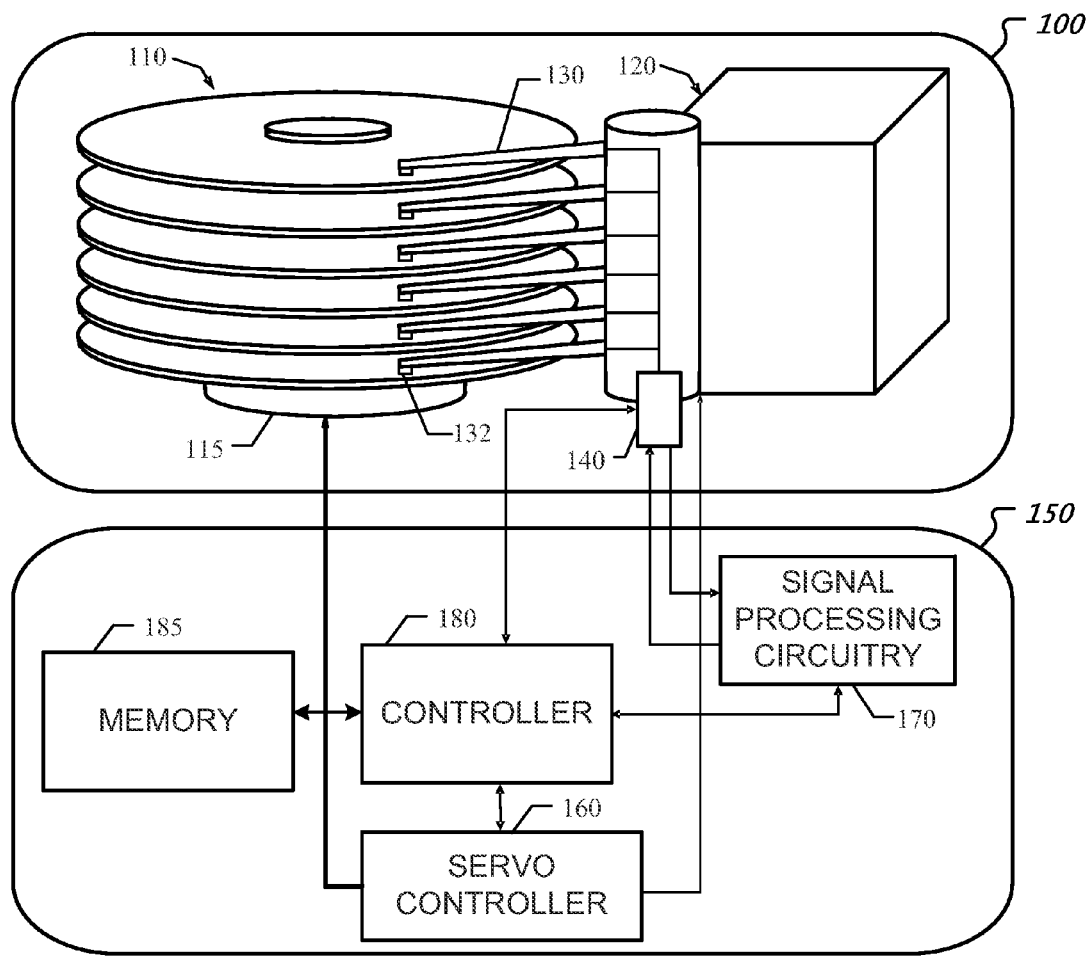
FIG. 2 shows an example of a disk drive system.

FIG. 2 shows an example of a disk drive system. The disk drive includes a head-disk assembly (HDA) 100 and drive electronics 150 (e.g., a printed circuit board assembly (PCBA) with semiconductor devices). The disk drive can include a magnetic recording medium such as disk(s) 110. The HDA 100 includes one or more disks 110 mounted on an integrated spindle and motor assembly 115. The integrated spindle and motor assembly 115 includes a spindle motor to rotate the disks 110. The spindle and motor assembly 115 rotates the disk(s) 110 under one or more drive heads such as read-write head(s) 132 mechanically coupled with a head assembly 120 in the HDA 100. A drive head such as a read-write head can include a transducer, e.g., a medium read element and a medium write element, or an integrated read/write element. In some implementations, a drive head can include a read head and a write head. The disk(s) 110 can be coated with a magnetically hard material (e.g., a particulate surface or a thin-film surface) and can be written to, or read from, a single side or both sides of each disk. In some implementations, the disk(s) 110 are coated with a magnetically material with predefined bit positions or bit cells, like bit-patterned media (BPM). For example, the disk(s) 110 can be coated with bit-patterned medium.

A read-write head 132 on an arm 130 can be positioned as needed to read or write data on the disk. A motor, such as a voice coil motor (VCM), can be used to position the read-write head 132 over a target track on a disk 110. The arm 130 can be a pivoting or sliding arm and can be spring-loaded to maintain a proper flying height for the head 132 in any drive orientation. The HDA 100 can include a preamp/writer 140, where head selection and sense current value(s) can be set. The preamp/writer 140 can amplify a read signal before outputting it to signal processing circuitry 170. Signals between the HDA 100 and drive electronics 150 can be carried through a flexible printed cable.

Drive electronics 150 can include a servo controller 160, signal processing circuitry 170, and controller 180. The signal processing circuitry 170 can include a read signal circuit, a servo signal processing circuit, and a write signal circuit. A controller 180 can include processor electronics such as one or more processors to operate the disk drive. The controller 180 can be configured to perform one or more techniques described herein. A controller 180 can communicate with a memory 185, such as a non-volatile memory to retrieve firmware to operate processor electronics. The memory 185 can store data such as model parameters generated by a synchronization technique described herein. In some implementations, controller 180 includes a storage area for computer program code and data.

The controller 180 can be communicatively coupled with an external processor or data bus to receive read/write instructions, receive data to write to disk(s) 110, and transmit data read from disk(s) 110. Controller 180 can direct a servo controller 160 to control mechanical operations, such as head positioning through the head assembly 120 and rotational speed control through the motor assembly 115. In some implementations, the controller 180 can be integrated with the servo controller 160 and/or signal processing circuitry 170 and can be implemented as one or more integrated circuits (ICs). Drive electronics 150 can also include one or more interfaces, such as a host-bus interface, and memory devices, such as a read only memory (ROM) for use by a microprocessor, and a random access memory (RAM) for use by a hard disk controller.

Disk(s) 110 are written with information such as servo wedges to aide the controller 180 in adjusting the position of the head 132 with respect to a track on the disk(s) 110. and to control the spindle and motor assembly 115. Servo wedge information read by a drive head can be converted from analog signals to digital data by a digital-analog converter, and fed into a servo controller 160. The servo positional information can be used to detect the location of the drive head in relation to a target track or target data sector on the disk(s) 110. A servo controller 160 can use, for example, target data sectors and servo position information to precisely place a head 132 over the target track and data sector on a disk(s) 110, and to continuously maintain head alignment with the target track while writing or reading data to or from one or more identified data sectors.

Figure 3:
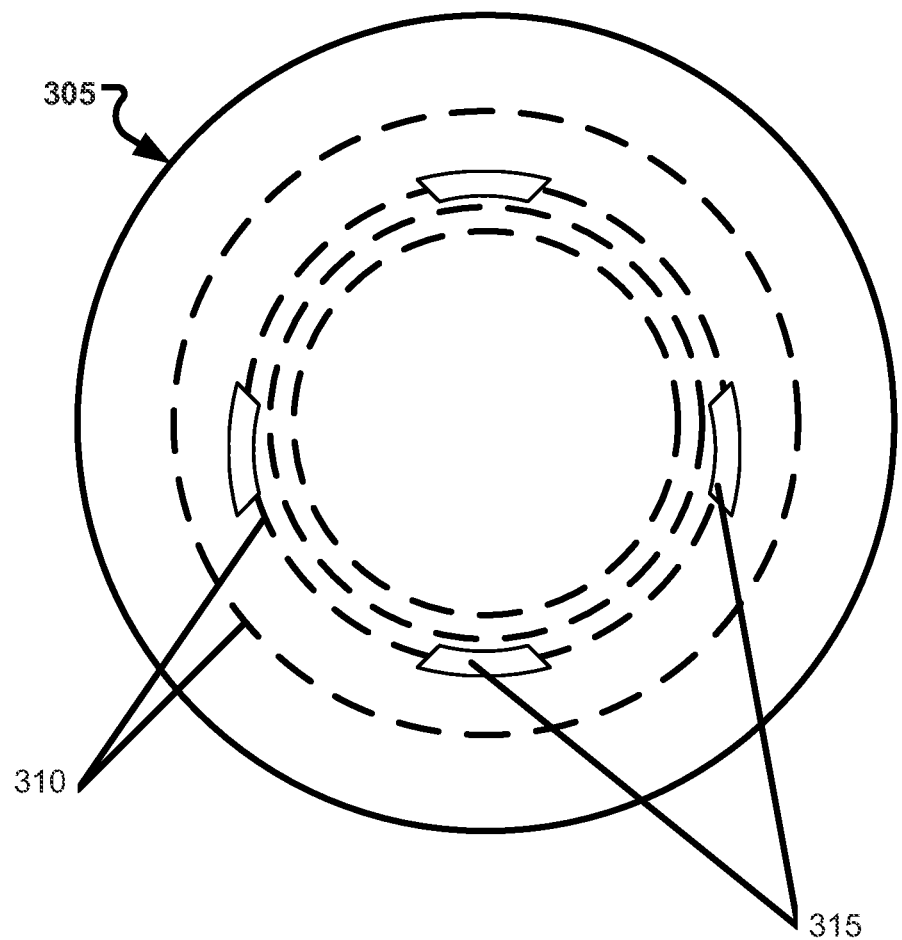
FIG. 3 shows an example of a surface of a recording medium that includes servo wedges.

FIG. 3 shows an example of a surface of a recording medium that includes servo wedges. A recording medium 305 includes multiple data tracks 310. The data tracks 310 are concentrically located areas defining tracks associated with different radii on a surface of the recording medium 305. Data tracks 310 are encoded with data representing position information such as servo wedges 315. In some implementations, a servo wedge 315 includes information such as a servo wedge index and a track number. A disk control system can use the servo wedges 315 to control a rotational speed of the recording medium 305. In some implementations, data tracks 310 are divided into multiple data sectors and formatted in radial zones. Radial zones radiating outwardly from the inner diameter (ID) to the outer diameter (OD) of the recording medium 305 can be written at progressively increased data frequencies to take advantage of an increase in linear velocity of the medium surface in the respective radial zones. Data tracks 310 can be interspersed or segregated by servo data written within the servo wedges 315 (e.g., that extend radially from the ID to the OD). Servo wedges 315 can be curved slightly (e.g., in a form of a spiral) in order to adjust for the trajectory of a head as the head sweeps across an area of the recording medium 305.

For sake of brevity and simplicity, FIG. 3 only shows four servo wedges 315 on one data track 310. However, a recording medium 305 can include significantly more servo wedges 315 (e.g., hundreds of servo wedges) on multiple data tracks 310.

The servo wedges 315 can be equally spaced about the circumference of the platter surface. Each servo wedge 315 can include servo patterns written thereon. For example, each servo wedge 315 can include data and supporting bit patterns that can be used for control and synchronization of a read/write head over a desired storage location on a recording medium 305. Specifically, the data positions by which the data is written to and read from the storage medium can be encoded in multiple servo wedges 315 positioned on each data track 310.

Servo patterns contained in each servo wedge 315 can be read by the drive head as the surface of the recording medium 305 passes under a drive head. Servo patterns written in the servo wedges 315 can provide a disk control system with head position control information to control an actuator arm when moving a drive head from starting tracks to destination tracks during random access track seeking operations. The servo patterns can provide a disk control system with head position control information to control an actuator arm when positioning and maintaining a drive head in proper alignment with a track during track following operations when user data are read from or written to data sectors on the data tracks 310.

In some implementations, before performing a read/write operation on a section of a data track 310, a read/write head can lock onto a desired track by referring to the positioning information retrieved using the servo patterns in a given servo wedge 315. By writing the servo wedges 315 onto the recording medium 305, the servo wedges 315 can provide the positioning information necessary to control a spindle motor rotating the recording medium 305 and to position a drive head to read and write data at the correct locations on the recording medium 305.

A servo wedge 315 can include a preamble, a sync mark (e.g., used for locking a phase and frequency of a servo timing loop clock to a given servo pattern), location information such as a track identification field and data block address (e.g., used for identifying a target track and data block), and burst fields (e.g., used for providing servo fine location information). The main servo can include a preamble, location information such as Servo Index Mark (SIM), Servo Address Mark (SAM), SIM/SAM (SSM), Gray Code (GC), and a Position Error Signal (PES).

Figure 4A:
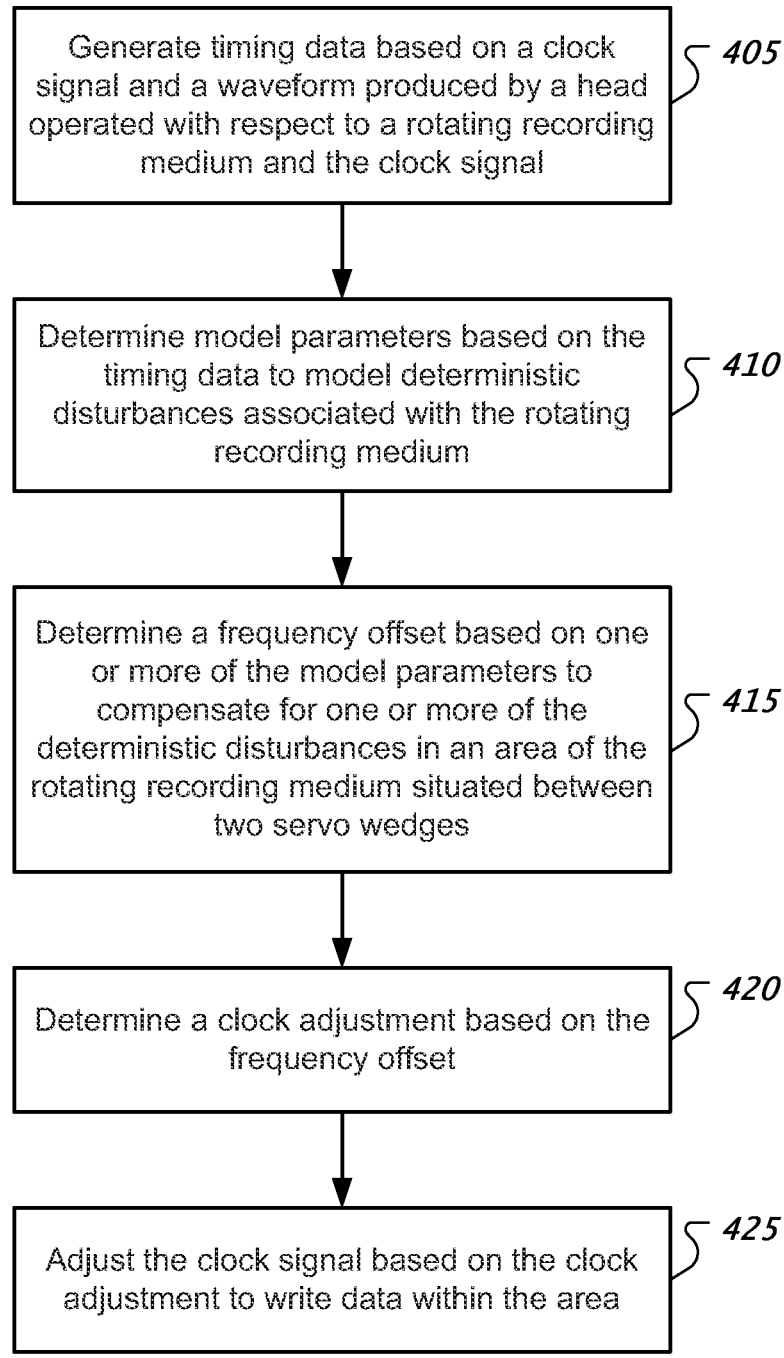
FIG. 4A shows an example of a disk drive synchronization process.

FIG. 4A shows an example of a disk drive synchronization process. At 405, a disk drive synchronization process can generate timing data based on a clock signal and a waveform produced by a head operated with respect to a rotating recording medium and the clock signal. The rotating recording medium can include multiple servo wedges arranged on multiple tracks. Timing data can include information based on a measurement of clock pulses of the clock signal between two servo wedges as indicated by the waveform. For example, timing data can include the number of clock pulses it takes for a drive head to pass from a first servo wedge to a second servo wedge on a track. In some implementations, timing data can include a clock pulse count and an associated servo wedge index identifying the starting servo wedge for the clock pulse count. In some implementations, timing data can include a clock pulse count and an associated servo wedge index identifying the ending servo wedge for the clock pulse count. Timing data can include one or more track indices and associated clock pulse counts and servo wedge indices.

At 410, the synchronization process can determine model parameters based on the timing data to model deterministic disturbances associated with the rotating recording medium.

For example, the synchronization process can model RRO components based on estimation techniques such as offline training, online training, or adaptive learning. In some implementations, modeling RRO components can include estimating amplitude and phase of RRO components. In some implementations, modeling RRO components can interpolate measurements of RRO components at various servo wedges on a track to model RRO components for the entire track. Offline training can include spinning a disk to obtain samples of RRO components. Online training can include spinning a disk to obtain samples of RRO components while applying an output of a PLL to suppress NRRO. Adaptive learning can include measuring RRO components during writing or reading operations to update one or more parameter in a synchronization technique.

At 415, the synchronization process can determine a frequency offset based on one or more of the model parameters to compensate for one or more of the deterministic disturbances in an area of the rotating recording medium situated between two servo wedges. For example, the synchronization process can input a track index and a servo wedge index associated with a target area of a track to a model that outputs a predicted RRO component for the target area. The synchronization process can calculate a frequency offset based on the predicted RRO component.

At 420, the synchronization process can determine a clock adjustment based on the frequency offset. In some implementations, the synchronization process determines a clock adjustment based on the frequency offset and a phase offset generated by a PLL.

At 425, the synchronization process can adjust the clock signal based on the clock adjustment to write data within the area. For example, the synchronization process can adjust the clock signal that controls a servo motor mechanically coupled with the recording medium.

Figure 4B:
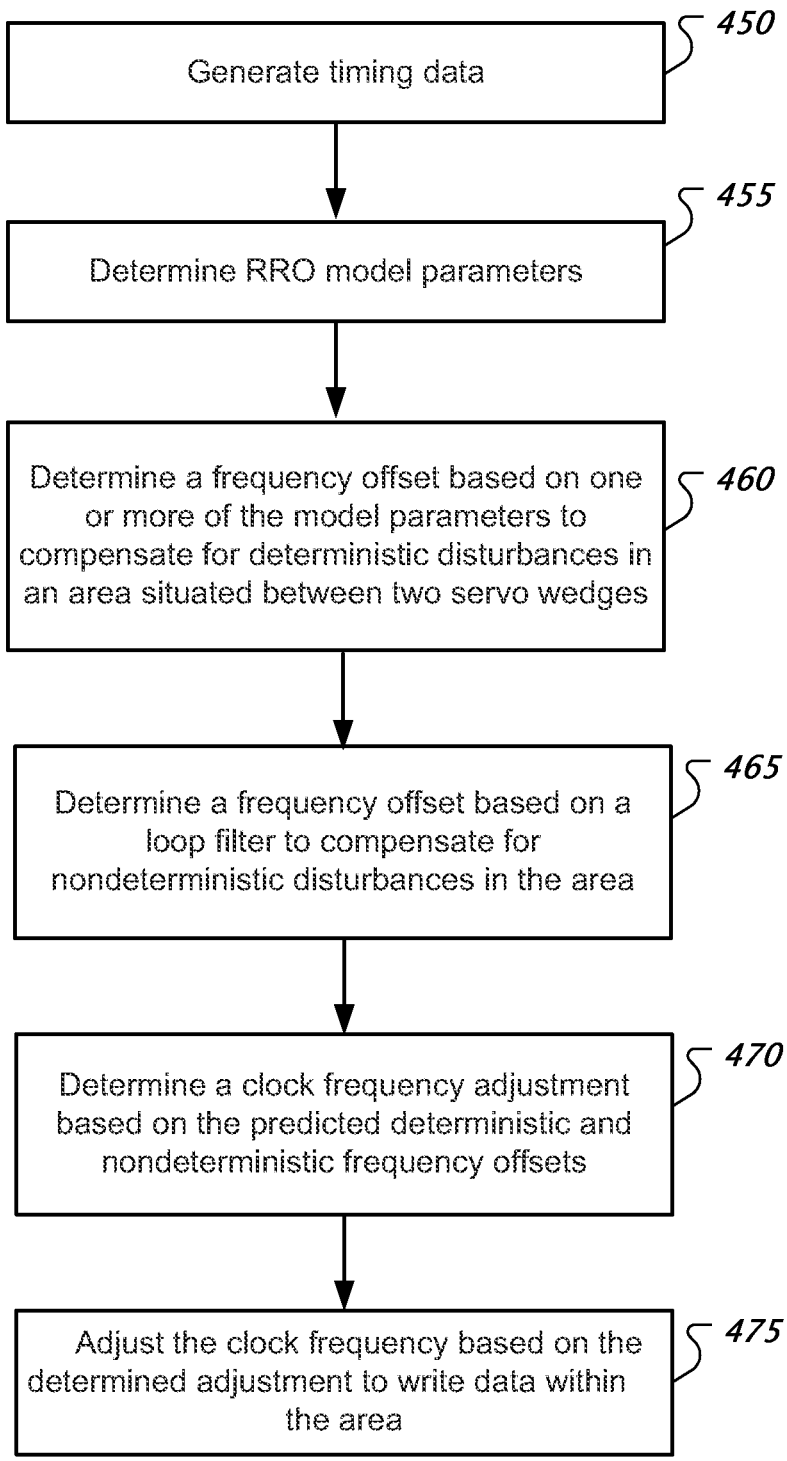
FIG. 4B shows another example of a disk drive synchronization process.

FIG. 4B shows another example of a disk drive synchronization process. At 450, a disk drive synchronization process can generate timing data based on the servo with respect to a rotating recording medium and the clock signal. The rotating recording medium can include multiple servo wedges arranged on multiple tracks. Timing data can include information based on a measurement of clock pulses of the clock signal between two consecutive servo wedges. For example, timing data can include the number of clock pulses it takes for a drive head to pass from one servo wedge to the next servo wedge on a track. In some implementations, timing data can include a clock pulse count between consecutive servo wedges and an associated servo wedge index identifying the starting servo wedge for the clock pulse count.

At 455, the synchronization process can determine one or more parameters of a RRO model based on the timing data to model deterministic disturbances associated with the rotating recording medium. For example, the synchronization process can estimate the RRO model components in different manners such as offline training, online training, or adaptive learning. In some implementations, modeling RRO components can include estimating amplitude and phase of the sinusoidal representation of RRO components. In some implementations, modeling RRO components can be done via an interpolation of the measurements of RRO components at various servo wedges on a track. Offline training can include spinning a disk to obtain samples of timing data without applying updates to the clock frequency. Online training can include spinning a disk to obtain samples of timing data while applying an output of a loop filter to suppress NRRO. Adaptive learning can include measuring timing data during writing or reading operations to update clock frequency in a synchronization technique.

At 460, the synchronization process can determine a frequency offset based on one or more RRO model parameters to compensate for one or more of the deterministic disturbances in an area of the rotating recording medium situated between two servo wedges. For example, the synchronization process can input a track index and a servo wedge index associated with a target area of a track to a model that outputs a predicted RRO component for the target area. The synchronization process can calculate a frequency offset based on the predicted RRO component. At 465, the synchronization process can determine a frequency offset based on the loop filter to compensate for one or more of nondeterministic disturbances in the area.

At 470, the synchronization process can determine a clock frequency adjustment based on the predicted deterministic and nondeterministic frequency offsets. In some implementations, the synchronization process determines a clock adjustment based on the frequency offset and a frequency offset generated by a loop filter. At 475, the synchronization process can adjust the clock frequency based on the determined adjustment to write data within the area.

In some implementations, determining a clock adjustment can include determining multiple clock adjustments for multiple adjacent sub-regions of a region on a track. In some implementations, a region is situated between two consecutive wedges on the track. A disk drive system can determine clock adjustments for respective sub-regions. Adjusting the clock frequency can include performing multiple adjustments to the clock frequency during a passage of the head over the adjacent sub-regions. In some implementations, a rotating recording medium can include a bit-pattern medium that predefines separated bit positions or bit cells on a track. A disk drive system can repeatedly update the clock frequency during a passage of the head between consecutive servo wedges on the track to write data to one or more of the separated bit positions.

Figure 5:
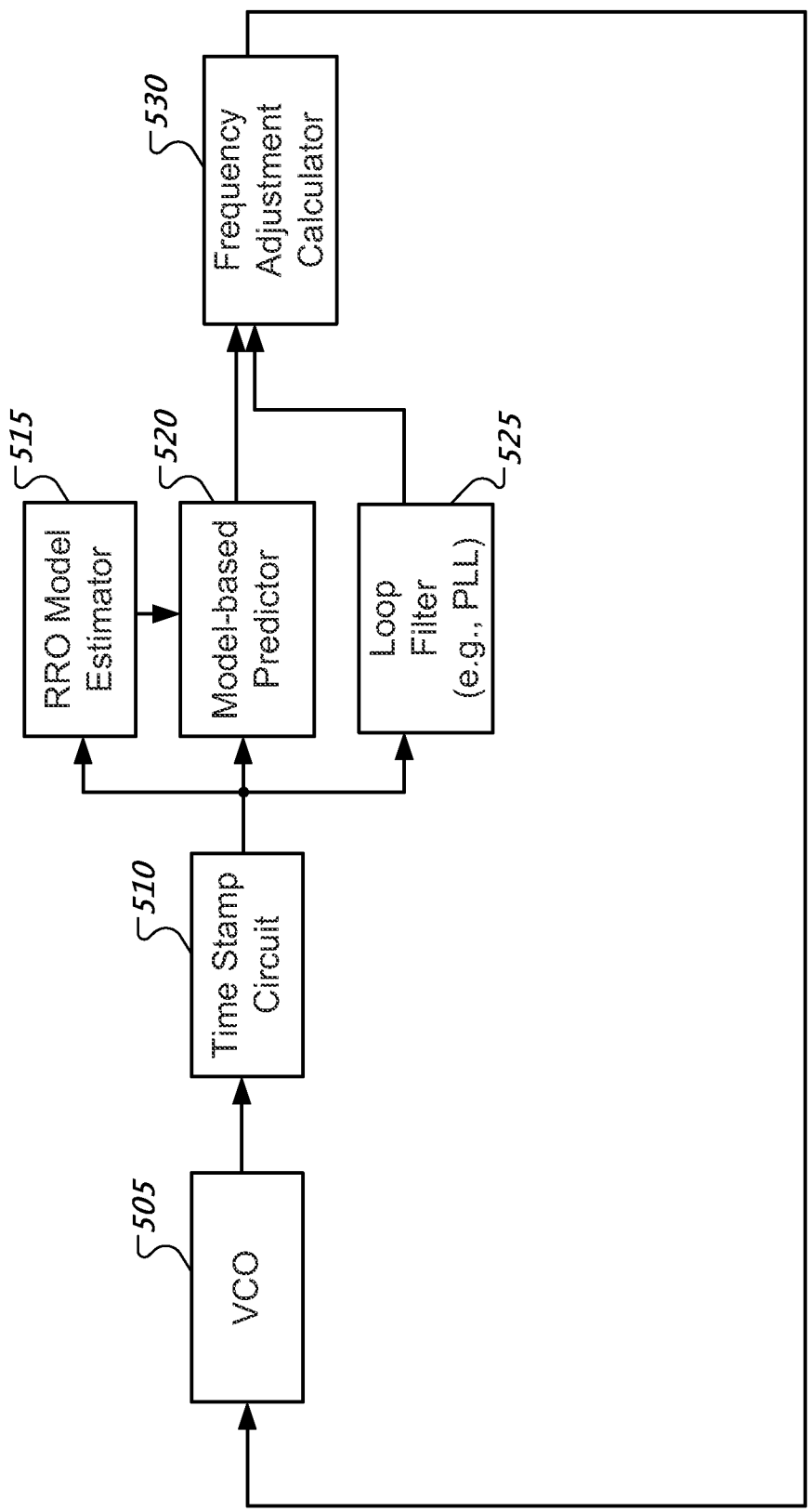
FIG. 5 shows an example of a block diagram of a clock frequency synchronization architecture.

FIG. 5 shows an example of a block diagram of a clock frequency synchronization architecture. A disk drive system can include a clock frequency synchronization system. A clock frequency synchronization architecture can include a voltage-controlled oscillator (VCO) 505, a time stamp circuit 510, a RRO model estimator 515, a model-based predictor 520, a loop filter 525, and a frequency adjustment calculator 530. A disk drive system can use an output of this clock frequency synchronization architecture to control the clock frequency. The time stamp circuit 510 can count the number of clock pulses between two adjacent servo wedges. The time stamp circuit 510 can communicate timing data to various system synchronization architecture components such as the RRO model estimator 515, model-based predictor 520, and the loop filter 525. In some implementations, a loop filter includes a phase locked loop (PLL).

The RRO model estimator 515 can estimate and track one or more RRO components based on the timing data to model RRO errors. The RRO model estimator 515 can provide a model-based predictor 520 with model parameters. The model-based predictor 520 can predict a RRO component for an area based on the model parameters and information that identifies the area, e.g., track radius and servo wedge index. A loop filter 525 can track the residual timing error to produce a signal to adjust the clock frequency to reduce random errors.

A frequency adjustment calculator 530 can generate a clock frequency adjustment based the predicted RRO component and the loop filter output for a given area on the recoding medium. In some implementations, a frequency adjustment calculator 530 can generate a clock adjustment based on the predicted RRO component and a frequency offset adjustment produced by the loop filter 525. The frequency adjustment calculator 530 can generate a signal to vary the VCO 505 based on the computed clock frequency adjustment. In some implementations, the clock frequency is consistently adjusted to track the RRO component between servo wedges to minimize timing errors. In some implementations, the loop filter 525 generates a signal that compensates for residual frequency and phase error after a RRO compensation has been applied.

In some implementations, a controller 180 can include one or more configurations to perform the operations of the RRO model estimator 515 and the model-based predictor 520. In some implementations, a controller 180 includes a processor to run firmware that implements one or more techniques described herein. The controller 180 can determine model parameters for one or more different models. The controller 180 can use frequency adjustments produced by a loop filter 525 operated on timing data. In some implementations, the controller 180 can determine model parameters based on the timing data and the one or more frequency adjustments.

A controller can determine sinusoidal harmonics associated with deterministic timing disturbances of a disk drive system. Model parameters can include amplitudes and phases of respective sinusoidal harmonics. The controller can estimate one or more amplitudes and phases of one or more sinusoidal harmonics.

A controller can determine repeatable run-out components at multiple servo wedges situated on a track of a rotating recording medium. Repeatable run-out components can be indicative of a repeatable difference between an expected time stamp count and a measured time stamp count between two consecutive servo wedges on the track. In some implementations, the controller can perform an interpolation of the repeatable run-out components at servo wedges to model repeatable run-out components for areas between consecutive servo wedges on the track. In some implementations, a controller can identify a sub-region of a region on a track based on information produced by a time stamp circuit. A region can include multiple sub-regions between consecutive servo wedges. The controller can predict a repeatable run-out frequency offset for the identified sub-region based on the interpolation.

Figure 6:
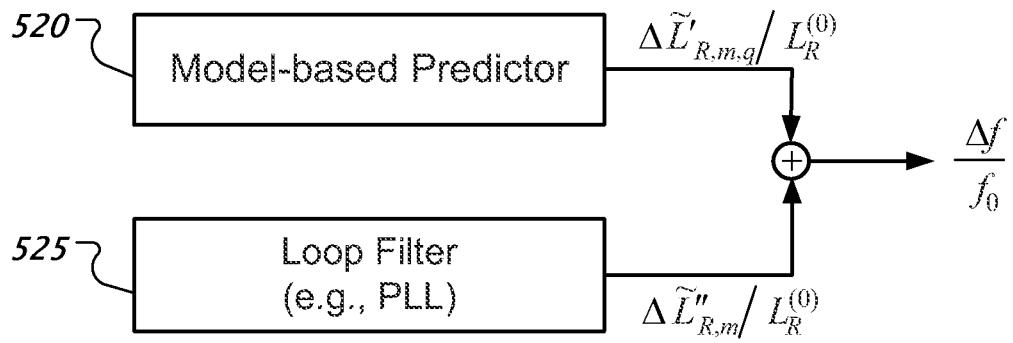
FIG. 6 shows an example of a model-based predictor and a loop filter combination.

FIG. 6 shows an example of a model-based predictor and a loop filter combination. A clock frequency synchronization architecture can combine the output of a model-based predictor 520 and a loop filter 525. Disk synchronization techniques can divide a region between two servo wedges into Q sub-regions. Disk synchronization techniques can operate the model-based predictor 520 to closely track RRO components for the sub-regions, respectively.

Before writing to a sub-region such as the $q^{th}$ sub-region between the $(m-1)^{th}$ and $m^{th}$ servo wedges, the model-based predictor 520 can predict a RRO frequency offset $\Delta \tilde{L}'_{R,m,q}$ that will occur in the sub-region. The loop filter 525 can predict a NRRO frequency offset $\Delta \tilde{L}''_{R,m}$ for the region between the $(m-1)^{th}$ and $m^{th}$ servo wedges based on the timing data obtained at the $(m-1)^{th}$ servo wedge, e.g., the time stamp count at the $(m-1)^{th}$ servo wedge.

Figure 7:
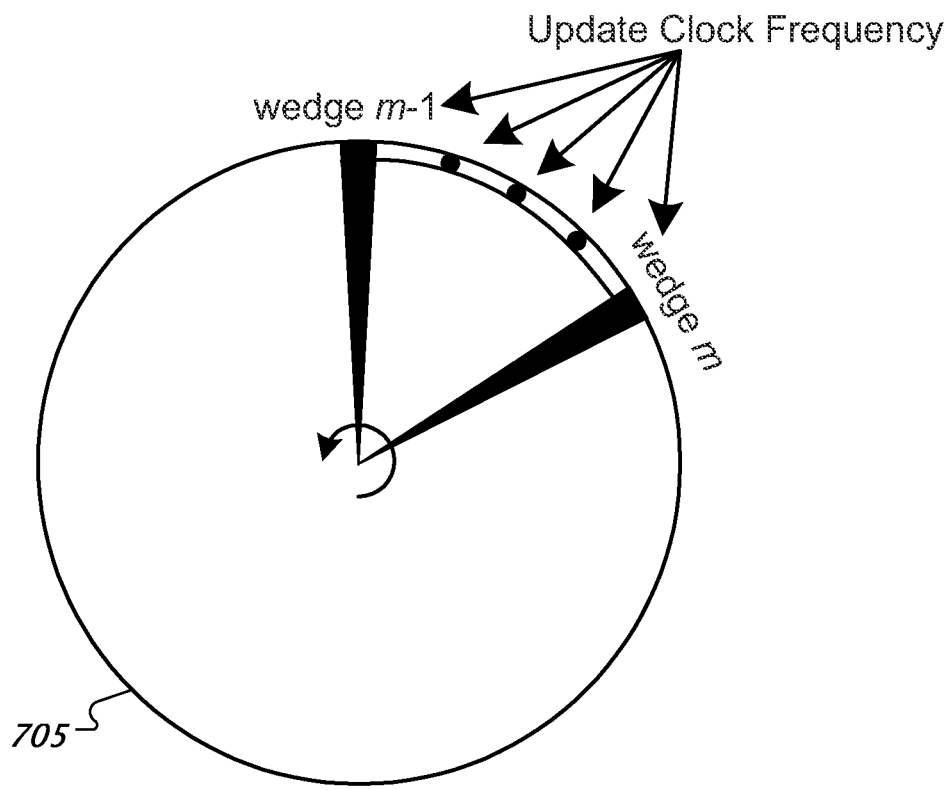
FIG. 7 shows an example of performing multiple clock frequency adjustments between two servo wedges.

FIG. 7 shows an example of performing multiple clock frequency adjustments between two servo wedges. Disk synchronization techniques can update the clock frequency at multiple times during the passage of a drive head between the $(m-1)^{th}$ and $m^{th}$ servo wedges on a recording medium 705. For example, a disk drive system can adjust the clock frequency before writing data to a sub-region. The model-based predictor 520 can provide information to update the clock frequency for each sub-region. The disk drive system can repeatedly update the clock frequency as the drive head moves over different sub-regions.

Sinusoidal Harmonic Model

Synchronization techniques can use a model that approximates a RRO component based on a sum of two or more sinusoidal harmonics of the fundamental frequency, e.g., fundamental spindle frequency. Determining model parameters for a sinusoidal harmonics model can include determining the amplitudes and phases of sinusoidal harmonics associated with one or more deterministic disturbances, e.g., a RRO component.

In a sinusoidal harmonics model, the clock frequency with only RRO error can be approximately represented by $$f_R(m) \approx \bar{f}_R \left(1 + \sum_i \left[A_{R,i}\sin\left(\frac{2\pi i}{M}m\right) + B_{R,i}\cos\left(\frac{2\pi i}{M}m\right)\right]\right)$$

where m represents a servo wedge index which can be fractional, $f_R(m)$ represents a clock frequency, $\bar{f}_R$ represents a mean clock frequency which can differ from a nominal frequency $f_R^{(0)}$, R represents a track radius, M represents the number of wedges, and $A_{R,i}$, $B_{R,i}$ represents amplitude of the sinusoidal harmonics. A RRO frequency offset can be predicted and compensated for during a write process based on estimating model parameters $A_{R,i}$ and $B_{R,i}$. Synchronization techniques can use various estimation techniques such as offline training and online adaptation/tracking to estimate model parameters.

Sinusoidal Harmonic Model—Offline Training

Synchronization techniques can use an offline training technique to estimate model parameters. An offline training technique does not perform clock frequency adjustments during the training process. Instead, the offline training technique rotates the disk for N revolutions along a track with radius R to collect timing data, e.g., the time stamp measurements. In some implementations, a time stamp count error associated with the $m^{th}$ servo wedges is given by $$\Delta L_{R,n,m} = L_R^{(0)} - L_{R,n,m}, n=0,1,\ldots,N-1,$$
$$m=0,1,\ldots,M-1$$

where $L_R^{(0)}$ represents a nominal time stamp count between two consecutive servo wedges, and $L_{R,n,m}$ represents a measured time stamp count between the $(m-1)^{th}$ and $m^{th}$ servo wedges. Time stamp circuitry such as a time stamp circuit 510 can produce $L_{R,n,m}$.

Due to the RRO error, the time stamp error can be approximately represented by $$\Delta L_{R,n,m} \approx \Delta \bar{L}_R - L_R^{(0)} \left(\sum_i \left[A_{R,i}\sin\left(\frac{2\pi i}{M}m\right) + B_{R,i}\cos\left(\frac{2\pi i}{M}m\right)\right]\right)$$

where $\Delta \bar{L}_R$ represents a mean time stamp error. A mean time stamp error is approximately equal to $$\frac{f_R^{(0)} - \bar{f}_R}{f_R^{(0)}} L_R^{(0)}.$$

The estimate of $\Delta \bar{L}_R$ is given by $$\Delta \hat{\bar{L}}_R = \frac{1}{NM} \sum_{n=0}^{N-1} \sum_{m=0}^{M-1} \Delta L_{R,n,m}.$$

The estimate of $A_{R,i}$ is given by $$\hat{A}_{R,i} = -\frac{1}{L_R^{(0)}} \frac{\sum_{n=0}^{N-1} \sum_{m=0}^{M-1} \Delta L_{R,n,m} \sin\left(\frac{2\pi i}{M} m\right)}{\sum_{n=0}^{N-1} \sum_{m=0}^{M-1} \sin^2\left(\frac{2\pi i}{M} m\right)}.$$

The estimate of $B_{R,i}$ is given by $$\hat{B}_{R,i} = -\frac{1}{L_R^{(0)}} \frac{\sum_{n=0}^{N-1} \sum_{m=0}^{M-1} \Delta L_{R,n,m} \cos\left(\frac{2\pi i}{M} m\right)}{\sum_{n=0}^{N-1} \sum_{m=0}^{M-1} \cos^2\left(\frac{2\pi i}{M} m\right)}.$$

Sinusoidal Harmonic Model—Online Training

Model parameters can vary over time. Thus, synchronization techniques can use an adaptation technique to update model parameters during drive operations such as reading operations or writing operations. In some implementations, synchronization techniques use a least-mean squares (LMS) algorithm to track and update model parameters during disk read and write processes. A disk drive system can frequently adjust the clock frequency based on loop filter output and model-based predictor output.

Adaptation techniques can update the model parameters during disk writing and reading. The residual phase error $e_{R,n,m}$ is given by $$e_{R,n,m} = \sum_{s=m_1}^{m} \Delta \tilde{L}_{R,n,s} + \Delta L_{R,n,m}, \; m = m_1, m_1+1, \ldots, m_2$$

where $\Delta \tilde{L}'_{R,n,s}$ represents an adjustment produced by the loop filter at servo wedge s−1 and $\Delta L_{R,n,m}$ represents a time stamp count error at servo wedge m. Here, the head flies from the $m_1^{th}$ wedge to the $m_2^{th}$ wedge.

Adaptation techniques can update model parameter estimates according to $$A_{R,i}^{(new)} = A_{R,i}^{(old)} - \alpha \sum_{m=m_1}^{m_2} e_{R,n,m} \sin\left(\frac{2\pi i}{M} m\right)$$

and $$B_{R,i}^{(new)} = B_{R,i}^{(old)} - \alpha \sum_{m=m_1}^{m_2} e_{R,n,m} \cos\left(\frac{2\pi i}{M} m\right)$$

where α represents an updating coefficient.

Sinusoidal Harmonic Model—Interpolation of Model Parameters

Synchronization techniques can interpolate model parameters as a function of track radius R. Synchronization techniques can estimate model parameters for several selected radii, e.g., $\hat{A}_{R_k,i}, \hat{B}_{R_k,i}$ for k=1, 2, . . . , K. The selected radii, $R_k$, k=1, 2, . . . , K, are distributed evenly from the ID to the OD. When writing or reading a track with radius R, the model parameters can be determined based on linear interpolation as $$A_{R,i} = \frac{R_{k2} - R}{R_{k2} - R_{k1}} A_{R_{k1},i} + \frac{R - R_{k1}}{R_{k2} - R_{k1}} A_{R_{k2},i}$$

and $$B_{R,i} = \frac{R_{k2} - R}{R_{k2} - R_{k1}} B_{R_{k1},i} + \frac{R - R_{k1}}{R_{k2} - R_{k1}} B_{R_{k2},i}$$

Adaptation techniques can use timing data measurements from reading or writing the track with radius R to update $\hat{A}_{R_{k1},i}, \hat{B}_{R_{k1},i}, \hat{A}_{R_{k2},i}, \hat{B}_{R_{k2},i}$ as follows:

$$\hat{A}_{R_{k1},i}^{(new)} = \hat{A}_{R_{k1},i}^{(old)} - \alpha \sum_{m=m_1}^{m_2} e_{R,n,m} \sin\left(\frac{2\pi i}{M} m\right)$$

$$\hat{B}_{R_{k1},i}^{(new)} = \hat{B}_{R_{k1},i}^{(old)} - \alpha \sum_{m=m_1}^{m_2} e_{R,n,m} \cos\left(\frac{2\pi i}{M} m\right)$$

and $$\hat{A}_{R_{k2},i}^{(new)} = \hat{A}_{R_{k2},i}^{(old)} - \alpha \sum_{m=m_1}^{m_2} e_{R,n,m} \sin\left(\frac{2\pi i}{M} m\right)$$

$$B_{R_{k2},i}^{(new)} = B_{R_{k2},i}^{(old)} - \alpha \sum_{m=m_1}^{m_2} e_{R,n,m} \cos\left(\frac{2\pi i}{M} m\right)$$

Period Function Model

Synchronization techniques can model RRO as a periodic function of the fundamental frequency. For a track with radius R, a data structure such as a vector:

$[L_{RRO,R,0} \; L_{RRO,R,1} \; \ldots \; L_{RRO,R,M-1}]$ represents the RRO components at the M servo wedges. A periodic function model is useful in modeling the RRO with a large number of harmonics.

Period Function Model—Offline Training

Synchronization techniques can use a training technique to estimate the model parameters for a periodic function RRO model. In some implementations, a training technique does not perform clock frequency adjustments during the training process. Instead, the offline training technique rotates the disk for N revolutions along a track with radius R to collect time stamp count errors $\Delta L_{R,n,m}$.

The RRO component at a servo wedge can be estimated by $$\hat{L}_{RRO,R,m} = \frac{1}{N} \sum_{n=0}^{N-1} \Delta L_{R,n,m}$$

RRO components between two servo wedges can be obtained through one or more interpolation techniques such as Fourier transform interpolation and low-pass filtering interpolation.

Fourier transform interpolation can include computing the discrete Fourier transform (DFT) of $\hat{L}_{RRO,R,m}$, m=0, 1, . . . , M−1, e.g., $$F_R(k) = \sum_{m=0}^{M-1} \hat{L}_{RRO,R,m} e^{-j\frac{2\pi km}{M}}, k = 0, 1, \ldots, M-1$$

Fourier transform interpolation can include constructing the frequency-domain vector based on $G_R(l)$ for $l=0, 1, \ldots, QM-1$. In some implementations, $G_R(l)$ is expressed by:

$$G_R(l) = \begin{cases} F_R(l), & \text{if } l = 0, 1, \ldots, \lceil M/2 \rceil - 1 \\ F_R(l - (Q-1)M), & \text{if } l = QM - \lceil M/2 \rceil + 1, QM - \lceil M/2 \rceil + 2, \ldots, QM - 1 \\ 0, & \text{otherwise} \end{cases}$$

Fourier transform interpolation can include taking the inverse discrete Fourier transform (IDFT) of $G_R(l)$ to obtain the interpolated samples for sub-regions between wedges, e.g., $$\hat{L}_{RRO,R,m,q} = \frac{1}{M} \sum_{l=0}^{QM-1} G_R(l) e^{j\frac{2\pi(Qm+q)l}{QM}},$$

$$m = 0, 1, \ldots, M-1, q = 0, 1, \ldots, Q-1$$

A model-based predicator can use $\hat{L}_{RRO,R,m,q}$ to compute a RRO component for the $q^{th}$ sub-region.

Low-pass filtering interpolation can include up-sampling the sequence of $\hat{L}_{RRO,R,m}$, $m=0, 1, \ldots, M-1$, by inserting $Q-1$ zeros between two consecutive samples. Low-pass filtering interpolation can include passing the resulting sequence through a low-pass filter. In some implementations, the cut-off frequency of the low-pass filter is set to be $\pi/Q$. Low-pass filtering interpolation can align filter output with wedge indices.

Period Function Model—Online Adaptation and Tracking

Synchronization techniques can use one or more adaptation techniques to update model parameters for a periodic function model. Adaptation techniques can perform tracking via a LMS algorithm. The residual model error is given by $$e_{R,n,m} = \sum_{s=0}^{m} \Delta \tilde{L}''_{R,n,s} + \Delta L_{R,n,m}, m = 0, 1, \ldots, M-1$$

where $\Delta \tilde{L}''_{R,n,s}$ represents an adjustment by the loop filter at wedge $s-1$ and $\Delta L_{R,n,m}$ represents a time stamp count error at wedge m. Adaptation techniques can update the RRO component estimate according to $$\hat{L}_{RRO,R,m}^{(new)} = \hat{L}_{RRO,R,m}^{(old)} - \alpha e_{R,n,m}$$

where $\alpha$ is an updating coefficient.

Adaptation techniques can perform tracking via Kalman Filtering. The dynamics in the RRO component can be modeled by the following state-space model:

$$x_{R,n+1,m} = Fx_{R,n,m} + u_{R,n,m}$$

$$y_{R,n,m} = Hx_{R,n,m} + v_{R,n,m}$$

where $y_{R,n,m}$ represents an observed timing error, $x_{R,n,m}$ represents a state vector, $u_{R,n,m}$ represents a random input noise vector, $v_{R,n,m}$ represents an observation noise, F represents a state transition matrix, and H representations an observation matrix.

In some implementations, the matrices and vectors in a state-space model are defined as $$x_{R,n,m} = \begin{bmatrix} x_{R,n,m} \\ \dot{x}_{R,n,m} \end{bmatrix}, u_{R,n,m} = \begin{bmatrix} w_{R,n,m} \\ u_{R,n,m} \end{bmatrix}, F = \begin{bmatrix} 1 & 1 \\ 0 & 1 \end{bmatrix}, H = \begin{bmatrix} 1 & 0 \end{bmatrix}.$$

Here, $w_{R,n,m}$, $u_{R,n,m}$, $v_{R,n,m}$ are independent and i.i.d. variables. These variables can be Gaussian distributed:

$$w_{R,n,m} \propto N(0, \sigma_w^2), u_{R,n,m} \propto N(0, \sigma_u^2), v_{R,n,m} \propto N(0, \sigma_v^2)$$

An online adaptation technique can compute $y_{R,n,m}$ for each revolution based on:

$$y_{R,n,m} = \hat{L}_{RRO,R,m}^{(n-1)} + \sum_{s=0}^{m} \Delta \tilde{L}''_{R,n,s} + \Delta L_{R,n,m}$$

where $\hat{L}_{RRO,R,m}^{(n-1)}$ represents a previously estimated RRO component, $\Delta \tilde{L}''_{R,n,s}$ represents a phase adjustment by the loop filter, and $\Delta L_{R,n,m}$ represents a time stamp count error at wedge m.

An initial state can be distributed according to $$x_{R,-1,m} = \begin{bmatrix} x_{R,-1,m} \\ \dot{x}_{R,-1,m} \end{bmatrix} \propto N\left(\begin{bmatrix} 0 \\ 0 \end{bmatrix}, \begin{bmatrix} \sigma_x^2 & 0 \\ 0 & \sigma_{\dot{x}}^2 \end{bmatrix}\right).$$

Let $$\hat{x}_{R,-1,m} = \begin{bmatrix} 0 \\ 0 \end{bmatrix}, \hat{\sum}_{R,-1,m} = \begin{bmatrix} \sigma_x^2 & 0 \\ 0 & \sigma_{\dot{x}}^2 \end{bmatrix}.$$

For every new measurement, the adaptation technique can compute and update the state vector iteratively according to:

$$\hat{x}_{R,n|n-1,m} = F\hat{x}_{R,n-1,m} = \begin{bmatrix} 1 & 1 \\ 0 & 1 \end{bmatrix} \hat{x}_{R,n-1,m},$$

$$\hat{\sum}_{R,n|n-1,m} = F \hat{\sum}_{R,n-1,m} F^T + Q = \begin{bmatrix} 1 & 1 \\ 0 & 1 \end{bmatrix} \hat{\sum}_{R,n-1,m} \begin{bmatrix} 1 & 0 \\ 1 & 1 \end{bmatrix} + \begin{bmatrix} \sigma_w^2 & 0 \\ 0 & \sigma_u^2 \end{bmatrix},$$

$$\hat{x}_{R,n,m} = \hat{x}_{R,n|n-1,m} + \hat{\sum}_{R,n|n-1,m} H^T \left( H \hat{\sum}_{R,n|n-1,m} H^T + \sigma_v^2 \right)^{-1}$$

$$(y_{R,n,m} - H\hat{x}_{R,n|n-1,m})$$

$$= \hat{x}_{R,n|n-1,m} + \hat{\sum}_{R,n|n-1,m} \begin{bmatrix} 1 \\ 0 \end{bmatrix} \left( \begin{bmatrix} 1 & 0 \end{bmatrix} \hat{\sum}_{R,n|n-1,m} \begin{bmatrix} 1 \\ 0 \end{bmatrix} + \sigma_v^2 \right)^{-1}$$

$$(y_{R,n,m} - \begin{bmatrix} 1 & 0 \end{bmatrix} \hat{x}_{R,n|n-1,m}),$$

and

-continued $$\sum_{R,n,m} = \sum_{R,n/n-1,m} - \sum_{R,n/n-1,m} H^T \left( H \sum_{R,n/n-1,m} H^T + \sigma_v^2 \right)^{-1} H \sum_{R,n/n-1,m}$$

$$= \sum_{R,n/n-1,m} - \sum_{R,n/n-1,m} \begin{bmatrix} 1 \\ 0 \end{bmatrix} \left( \begin{bmatrix} 1 & 0 \end{bmatrix} \sum_{R,n/n-1,m} \begin{bmatrix} 1 \\ 0 \end{bmatrix} + \sigma_v^2 \right)^{-1}$$

$$\begin{bmatrix} 1 & 0 \end{bmatrix} \sum_{R,n/n-1,m}$$

A periodic function model based predicator can compute predicted RRO components based on $$\hat{L}_{RRO,R,m}^{(n/n-1)} = H\hat{x}_{R,n/n-1,m} = [1\ 0]\hat{x}_{R,n/n-1,m}$$

and $$\hat{L}_{RRO,R,m}^{(n)} = H\hat{x}_{R,n,m} = [1\ 0]\hat{x}_{R,n,m}$$

Adaptation techniques can perform tracking via linear prediction. Since the variations in the RRO component and phase noise are low-frequency in nature, linear prediction can use previously observed RRO errors to predict the current RRO error. Adaptation techniques can pre-compute fixed linear predictor coefficients $a_p$, $p=1, 2, \ldots, P$. The predicted RRO component are given by $$\hat{L}_{RRO,R,m}^{(n/n-1)} = \sum_{p=1}^{P} a_p \hat{L}_{RRO,R,m}^{(n-p)},$$

$$\hat{L}_{RRO,R,m}^{(n)} = y_{R,n,m}$$

Synchronization techniques can interpolate model parameters for a periodic function model as a function of track radius R. Synchronization techniques can track the RRO component estimates for two or more radii.

Period Function Model—Interpolation of Model Parameters

Synchronization techniques can interpolate model parameters for a periodic function model as a function of track radius R. Synchronization techniques can determine model parameters for several radii, e.g., $\hat{L}_{RRO,R_k,m}$ for $k=1, 2, \ldots, K$. In some implementations, the selected radii, $R_k$, $k=1, 2, \ldots, K$, are distributed evenly from the ID to the OD. Based on linear interpolation, the model-based predicator can determine:

$$\hat{L}_{RRO,R,m} = \frac{R_{k2}-R}{R_{k2}-R_{k1}}\hat{L}_{RRO,R_{k1},m} + \frac{R-R_{k1}}{R_{k2}-R_{k1}}\hat{L}_{RRO,R_{k2},m}$$

Synchronization techniques can use the measurements from reading or writing the track with radius R to update $\hat{L}_{RRO,R_{k1},m}$ and $\hat{L}_{RRO,R_{k2},m}$ by letting $$y_{R_{k1},n,m} = \hat{L}_{RRO,R_{k1},m}^{(n-1)} + \sum_{s=0}^{m} \Delta\tilde{L}_{R,n,s}'' + \Delta L_{R,n,m}$$

and $$y_{R_{k2},n,m} = \hat{L}_{RRO,R_{k2},m}^{(n-1)} + \sum_{s=0}^{m} \Delta\tilde{L}_{R,n,s}'' + \Delta L_{R,n,m}.$$

Hybrid Model

Synchronization techniques can use a hybrid model that combines a sinusoidal harmonics model and a periodic function model. In a hybrid model, a RRO component can be modeled as $$L_{RRO,R,m} = L_R^{(0)} \sum_{i=1}^{I} \left[ A_{R,i} \sin\left(\frac{2\pi i}{M}m\right) + B_{R,i}\cos\left(\frac{2\pi i}{M}m\right) \right] + L'_{RRO,R,m}$$

where $A_{R,i}$ and $B_{R,i}$ represent amplitudes of the first I harmonics and $L'_{RRO,R,m}$ represents a residual periodic component. Model parameters for a hybrid model can be determined via offline training or online training Model parameters for a hybrid model can include sinusoidal parameters and periodic function parameters.

Model parameters for a hybrid model can be updated using a hybrid model adaptation technique. A hybrid model adaptation technique can compute updated parameters based on:

$$y_{R,n,m} = \sum_{s=0}^{m} \Delta\tilde{L}_{R,n,s}'' + (L_R^{(0)} - L_{R,n,m}), m = 0, 1, \ldots, M-1$$

The hybrid model adaptation technique can update sinusoidal parameter estimates according to $$A_{R,i}^{(new)} = A_{R,i}^{(old)} - \alpha \sum_{m=0}^{M-1} y_{R,n,m} \sin\left(\frac{2\pi i}{M}m\right)$$

$$B_{R,i}^{(new)} = B_{R,i}^{(old)} - \alpha \sum_{m=m_1}^{M-1} y_{R,n,m} \cos\left(\frac{2\pi i}{M}m\right)$$

where $\alpha$ represents an updating coefficient. The hybrid model adaptation technique can update periodic function parameter estimates according to $$L_{RRO,R,m}^{(new)} = L_{RRO,R,m}^{(old)} - \alpha e_{R,n,m}.$$

where $$e_{R,n,m} =$$

$$-y_{R,m} - L_R^{(0)} \sum_{i=1}^{I} \left[ \left(A_{R,i}^{(new)} - A_{R,i}^{(old)}\right)\sin\left(\frac{2\pi i}{M}m\right) + \left(B_{R,i}^{(new)} - B_{R,i}^{(old)}\right)\cos\left(\frac{2\pi i}{M}m\right) \right].$$

Loop Filter

Synchronization techniques can include operating a loop filter in hardware. The transfer function of the loop filter can be expressed by:

$$\alpha + \frac{\beta}{1-z^{-1}}.$$

The input to such a loop filter can include $L_{R,n,m}$. The loop filter can output information such as $\Delta\tilde{L}''_{R,n,m}$. At each wedge, the residual phase error can be expressed as:

$$\Delta\hat{L}''_{R,n,m} = L_R^{(0)} - L_{R,n,m}.$$

A loop filter output can be computed based on $$x_{-1}=0, x_m = x_{m-1} + \beta \Delta \hat{L}''_{R,n,m-1}$$

$$\Delta \tilde{L}''_{R,n,m} = x_m + \alpha \Delta \hat{L}''_{R,n,m-1}.$$

Frequency adjustment circuitry can provide frequency adjustments to adjust a clock frequency. The new frequency can be determined based on:

$$f_{new} = f_{old} + \Delta f = f_{old}\left(1 + \frac{\Delta f}{f_{old}}\right).$$

When writing to the disk, frequency adjustments can be made at each servo wedge and between servo wedges. At each servo wedge, the frequency can be adjusted according to $$f_{new} = f_{old}\left(1 - \frac{\Delta \tilde{L}'_{R,m,q}}{L_R^{(0)}} + \frac{\Delta \tilde{L}''_{R,n,m}}{L_R^{(0)}}\right).$$

When operating between servo wedges to write data, the frequency can be adjusted according to $$f_{new} = f_{old}\left(1 - \frac{\Delta \tilde{L}'_{R,m,q}}{L_R^{(0)}}\right).$$

Figure 8:
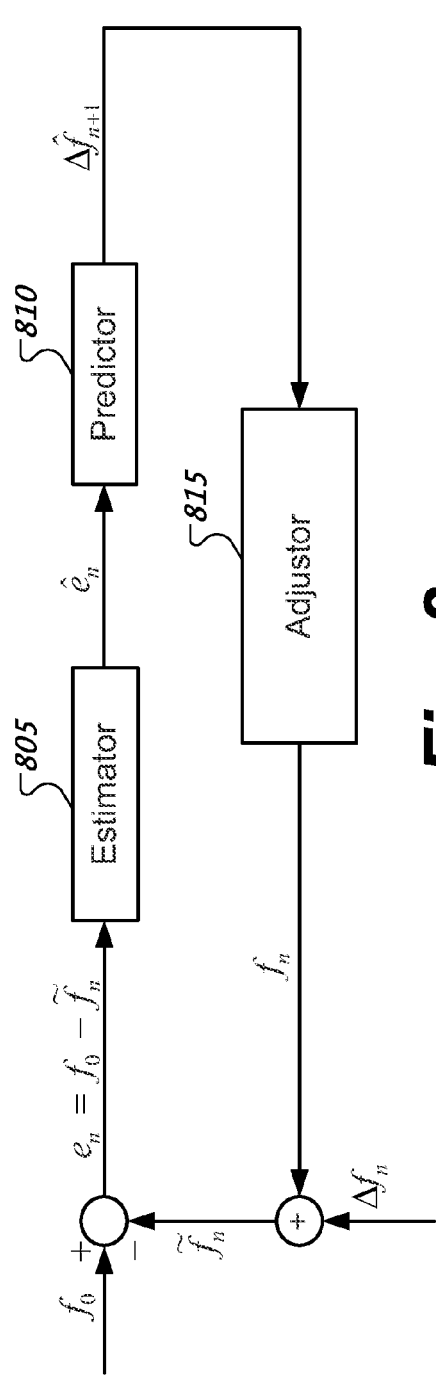
FIG. 8 shows an example of a block diagram of a feedback frequency synchronization architecture.

FIG. 8 shows an example of a block diagram of a feedback frequency synchronization architecture. A clock frequency synchronization architecture can include an estimator 805 configured to use servo information, a predictor 810, and an adjustor 815 to adjust the frequency of an oscillator. In this example, $f_0$ represents a desired clock frequency, this clock indicates and controls the correct number of bits that should be written into a specific region in the media; $f_n$ represents the nominal frequency of the voltage-controlled oscillator (VCO); $\Delta f_n$ represents a frequency offset, the difference between the actual write-clock frequency and the nominal frequency of VCO, which is caused by factors such as disk slip, phase noise and air turbulence etc; $\tilde{f}_n$ represents an actual clock frequency, the actual clock applied in the write process; $e_n = f_0 - \tilde{f}_n$ represents the clock frequency error; $\hat{e}_n$ represents an estimated clock frequency error, this is done through the servo information; and $\Delta \hat{f}_{n+1}$ represents a predicted frequency offset for the next stage.

The adjustor 815 can adjust the nominal frequency $f_n$ of a VCO. In some implementations, the adjustor 815 can write $f_n$ to adjust the VCO frequency. In some implementations, the frequency offset term $\Delta f_n$ represents unexpected frequency drifts that are caused by deterministic and random factors. The clock frequency error $e_n$ can be estimated at each wedge by:

$$\hat{e}_n = SM(L_0 - L_n)$$

where $L_o$ is the desired number of clock counts between adjacent servo wedges, $L_n$ is the actual number of clock counts between adjacent servo wedges, S is the rotational speed of the spindle, and M is the number wedges.

The predictor 810 can estimate the frequency offset $\Delta f_{n+1}$ from the error sequence $\hat{e}_n, \hat{e}_{n-1}, \ldots$ for the next recording region. The adjustor 815 can use the estimated $\Delta \hat{f}_{n+1}$ to set the nominal frequency $f_{n+1}$ for the VCO, e.g., $f_{n+1} = f_0 - \Delta \hat{f}_{n+1}$.

Figure 9:
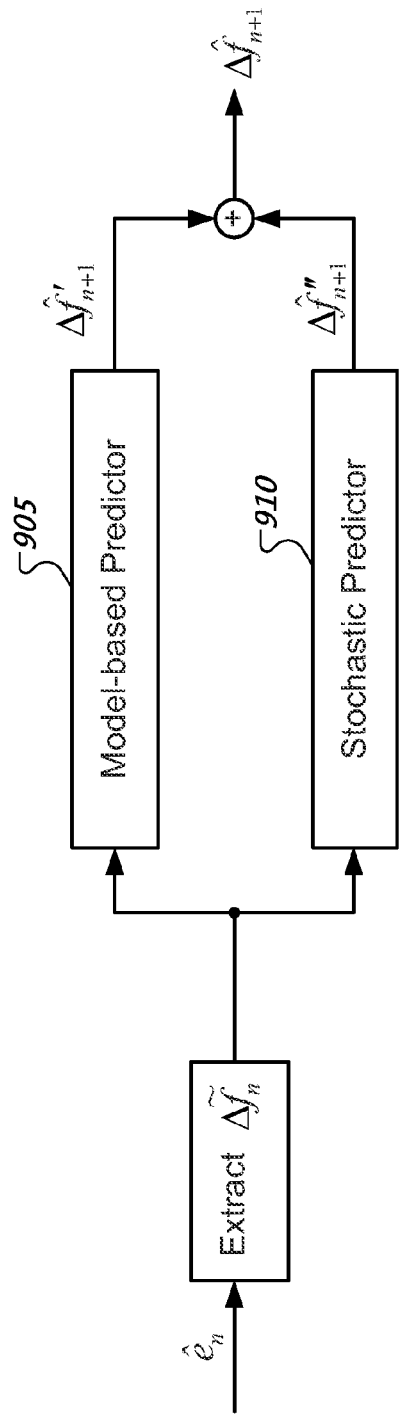
FIG. 9 shows another example of a predictor.

FIG. 9 shows another example of a predictor. A predictor can include a model-based predictor 905 and a linear stochastic predictor 910. The model-based predictor 905 is used to estimate the deterministic frequency offset component caused by systematic components such as disk slips while the stochastic predictor 910 is used to estimate the random frequency offset caused by factors such as phase noise.

The spectrum of a nondeterministic frequency offset may have a 1/f shape. The optimal linear prediction filter coefficients $a_m$, m=0, 1, ..., M−1 can be obtained by $a = R^{-1}r$, where $$a = \begin{bmatrix} a_0 \\ a_1 \\ \vdots \\ a_{M-1} \end{bmatrix}, R = \begin{bmatrix} r_0 & r_1 & \cdots & r_{M-1} \\ r_1 & r_0 & \cdots & r_{M-2} \\ \vdots & \vdots & \ddots & \vdots \\ r_{M-1} & r_{M-2} & \cdots & r_0 \end{bmatrix}, r = \begin{bmatrix} r_1 \\ r_2 \\ \vdots \\ r_M \end{bmatrix}$$

and the auto-correlation coefficients $r_m$ can be computed from a power spectral density (PSD) of the frequency noise.

Synchronization techniques can adaptively update linear prediction filter coefficients to compensate for variations in the random noise spectrum. The standard least-mean squares (LMS) algorithm can be used to achieve this objective, e.g., $$\varepsilon^{(n+1)} = \Delta \tilde{f}''_{n+1} - \sum_{m=0}^{M-1} a_m \Delta \tilde{f}''_{n-m}, \quad a^{(n+1)} = a^{(n)} + \mu \varepsilon^{(n+1)} b^{(n)}$$

where $a^{(n+1)}$ is the filter coefficients at time n+1, $a^{(n)}$ is the filter coefficients at time n, $\mu > 0$ is the updating step size, $\varepsilon^{(n+1)}$ is the prediction error, and $b^{(n)}$ is the data vector, e.g., $$a^{(n+1)} = \begin{bmatrix} a_0^{(n+1)} \\ a_1^{(n+1)} \\ \vdots \\ a_{M-1}^{(n+1)} \end{bmatrix}, a^{(n)} = \begin{bmatrix} a_0^{(n)} \\ a_1^{(n)} \\ \vdots \\ a_{M-1}^{(n)} \end{bmatrix}, b^{(n)} = \begin{bmatrix} \Delta \tilde{f}''_n \\ \Delta \tilde{f}''_{n-1} \\ \vdots \\ \Delta \tilde{f}''_{n-M+1} \end{bmatrix}.$$

Additional Embodiments

In some implementations, a synchronization technique can represent a clock frequency with the RRO error by:

$$f_R^{(0)}\left[1 + A_{1,R}\cos\left(\frac{2\pi}{M}m + \theta_{1,R}\right) + \right.$$
$$\left. A_{2,R}\cos\left(\frac{4\pi}{M}m + \theta_{2,R}\right) + A_{3,R}\cos\left(\frac{6\pi}{M}m + \theta_{3,R}\right) + \ldots \right],$$

where $f_R^{(0)}$ represents nominal clock frequency, R represents track radius, M represents number of wedges, $A_{1,R}, A_{2,R}, A_{3,R}$ represent unknown amplitude of the sinusoidal components, $\theta_{1,R}, \theta_{2,R}, \theta_{3,R}$ represent unknown phase of the sinusoidal components, and m represents a servo wedge index.

A synchronization technique can estimate RRO model parameters such as $A_{1,R}, A_{2,R}, A_{3,R}$ and $\theta_{1,R}, \theta_{2,R}, \theta_{3,R}$ which respectively represent multiple unknown amplitudes and phases of multiple sinusoidal components. The synchronization technique can use the RRO model parameters to predict a RRO frequency offset at each point when the disk is rotating. In some implementations, this enables a disk drive to use model-based techniques to compensate for the RRO errors. In some cases, it has been shown that in the presence of 3% disk slip, this can effectively reduce the error to below 0.2 bit-period time, in contrast to 2.9 bit-period time by non-model-based methods for a 1.6 GHz data rate.

One technique to estimate the model parameters can be performed in an open-loop configuration by using the direct measurements. That is, the disk is rotated for a fixed number of revolutions. During the rotation, the feedback loop for frequency adjustment is turned off. The servo clock counts between adjacent servo wedges can be recorded to estimate the model parameters. For example, the servo clock counts between adjacent servo wedges can be represented by $$L_{m,R} \approx \bar{L}_R \left[ 1 + A_{1,R} \cos\left(\frac{2\pi}{M}m + \theta_{1,R}\right) + A_{2,R} \cos\left(\frac{4\pi}{M}m + \theta_{2,R}\right) + A_{3,R} \cos\left(\frac{6\pi}{M}m + \theta_{3,R}\right) + \ldots \right]$$

where $L_{m,R}$ represents a measured servo clock count between adjacent wedges, $\bar{L}_R$ represents a mean clock count between two wedges.

An estimator can estimate model parameters by computing:

$$\hat{\theta}_{i,R} = -\tan^{-1}\left(\frac{\sum_{m=0}^{NM-1} x(m)\sin\left(\frac{2\pi mi}{M}\right)}{\sum_{m=0}^{NM-1} x(m)\cos\left(\frac{2\pi mi}{M}\right)}\right)$$

$$\hat{A}_{i,R} = \frac{\sum_{m=0}^{NM-1} x(m)\cos\left(\frac{2\pi mi}{M} + \hat{\theta}_{i,R}\right)}{\sum_{m=0}^{NM-1} \cos^2\left(\frac{2\pi mi}{M} + \hat{\theta}_{i,R}\right)}, i = 1, 2, 3$$

where $$x(m) = \frac{L_{m,R}}{\hat{\bar{L}}_R} \text{ and } \hat{\bar{L}}_R = \frac{1}{NM}\sum_{m=0}^{NM-1} L_{m,R}.$$

In this estimator, the measurements can be obtained from a time stamp circuit of a servo clock and are susceptible to all noise sources, including the phase noise and air disturbance. If the signal-to-noise ratio (SNR) is low, more revolutions to get more measurements in order to suppress the noise can be required. Thus, some synchronization techniques can operate a closed-loop configuration that uses the output from the PLL filter to perform RRO model parameter estimation. Such techniques can decrease the number of disk revolutions required to estimate parameters, because the PLL can suppress noise and enhance the SNR.

Figure 10:
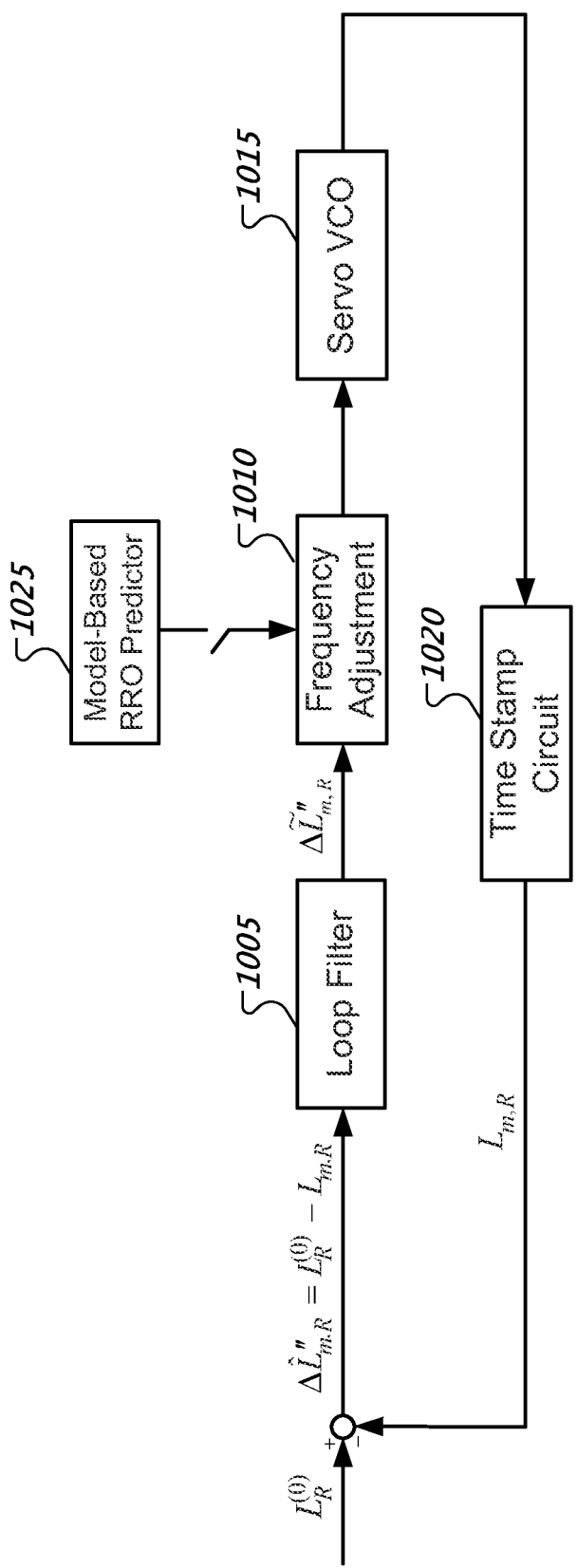
FIG. 10 shows an example of a loop filter architecture for servo clock frequency synchronization.

FIG. 10 shows an example of a loop filter architecture for servo clock frequency synchronization. A phase-locked loop architecture can include a loop filter 1005, a frequency adjustment 1010, a servo VCO (SVCO) 1015, and a time stamp circuit 1020. A model-based RRO predictor 1025 can periodically provide frequency offsets based on predicted RRO component. The phase-locked loop architecture can include a switch to control communication between the model-based RRO predictor 1025 and the frequency adjustment 1010.

The time stamp circuit 1020 can count the servo clock between adjacent servo wedges. The loop filter 1005 input includes the residual clock count error at each wedge, which can be given by the difference between the desired servo clock count and the measured clock count, e.g., $\Delta \hat{L}''_{m,R} = L_R^{(0)} - L_{m,R}$. The loop filter 1005 output can be used to adjust the frequency of the servo clock in order to minimize frequency error.

Figure 11:
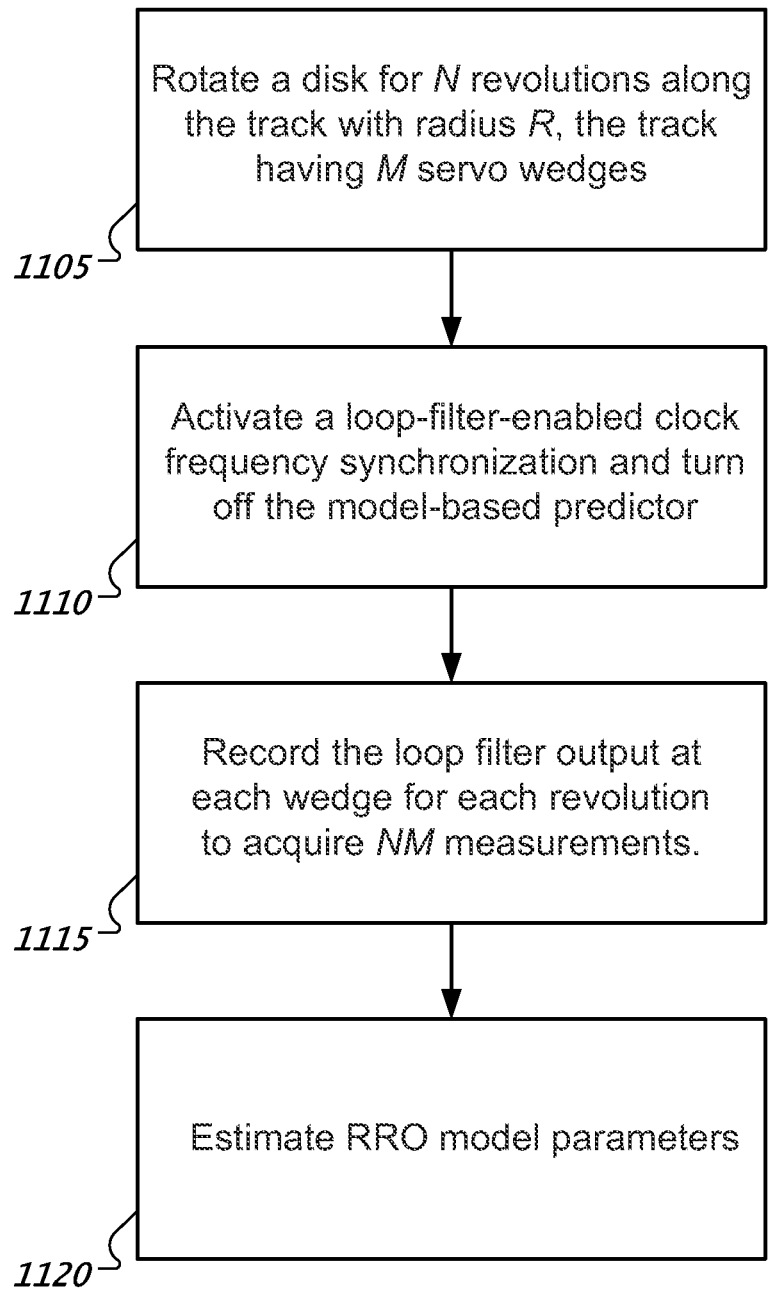
FIG. 11 shows an example of an offline parameter estimation process in a closed-loop configuration.

FIG. 11 shows an example of an offline parameter estimation process in a closed-loop configuration. Input to an offline parameter estimation technique can include loop filter 1005 output $\Delta \hat{L}''_{m,R}$, m=0, 1, . . . , NM−1. The offline parameter estimation technique generate amplitude and phase model parameters, e.g., $\hat{A}_{1,R}, \hat{\theta}_{1,R}, \hat{A}_{2,R}, \hat{\theta}_{2,R}, \hat{A}_{3,R}, \hat{\theta}_{3,R}$, for a sinusoidal harmonic RRO model.

At 1105, the process rotates the disk for N revolutions along the track with radius R. The track at radius R can have M servo wedges. At 1110, the process activates a loop-filter-enabled clock frequency synchronization and turns off a model-based predictor. At 1115, the process records the loop filter output at each wedge for each revolution to acquire NM measurements, which are denoted by $\Delta \hat{L}''_{m,R}$, m=0, 1, . . . , NM−1. The measurements are approximately equal to $$\Delta \tilde{L}''_{m,R} \approx L_R^{(0)} \frac{2\pi}{M}\left[A_{1,R}\sin\left(\frac{2\pi}{M}m + \theta_{1,R}\right) + 2A_{2,R}\sin\left(\frac{4\pi}{M}m + \theta_{2,R}\right) + 3A_{3,R}\sin\left(\frac{6\pi}{M}m + \theta_{3,R}\right)\right]$$

where $L_R^{(0)}$ represents a nominal clock count between adjacent wedges.

At 1120, the process estimates RRO model parameters. In some implementations, the process estimates RRO model parameters based on computing:

$$\hat{\theta}_{i,R} = \tan^{-1}\left(\frac{\sum_{m=0}^{NM-1} y(m)\cos\left(\frac{2\pi mi}{M}\right)}{\sum_{m=0}^{NM-1} y(m)\sin\left(\frac{2\pi mi}{M}\right)}\right)$$

$$\hat{A}_{i,R} = \frac{\sum_{m=0}^{NM-1} y(m)\sin\left(\frac{2\pi mi}{M} + \hat{\theta}_{i,R}\right)}{i\sum_{m=0}^{NM-1} \sin^2\left(\frac{2\pi mi}{M} + \hat{\theta}_{i,R}\right)}, i = 1, 2, 3$$

where $$y(m) = \frac{M \Delta \tilde{L}''_{m,R}}{2\pi L_R^{(0)}}.$$

Figure 12:
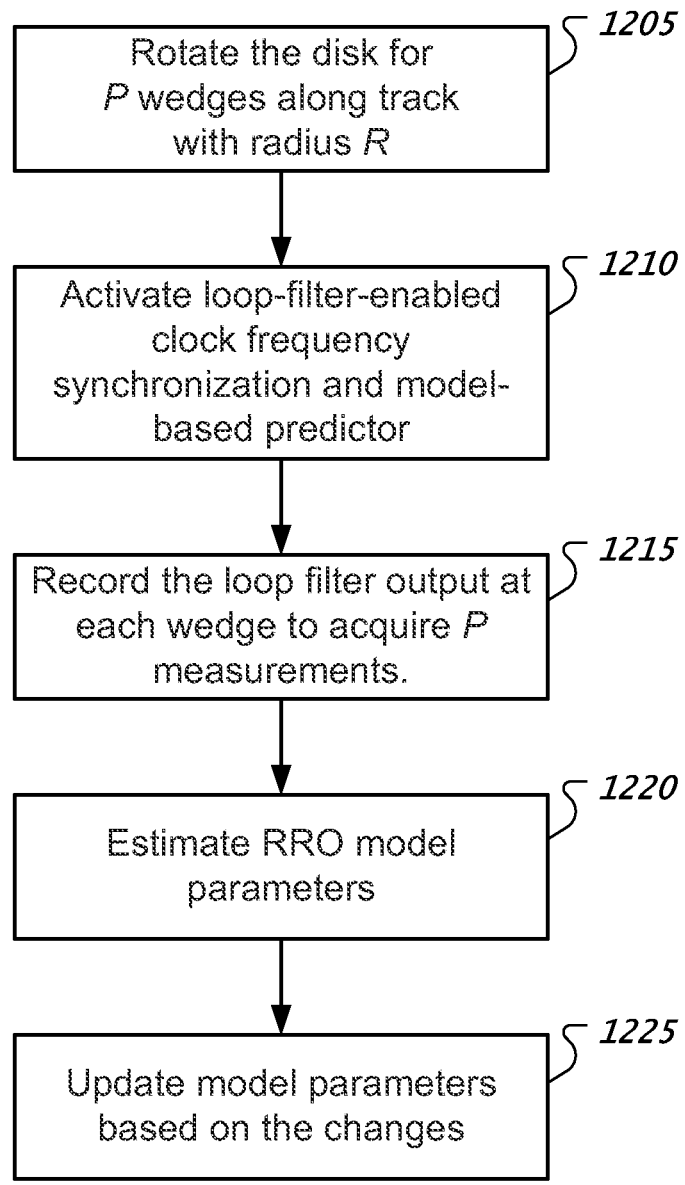
FIG. 12 shows an example of an online parameter estimation process in a closed-loop configuration.

FIG. 12 shows an example of an online parameter estimation process in a closed-loop configuration. Input to an online parameter estimation technique can include loop filter 1005 output $\Delta \hat{L}''_{m,R}$, m=0, 1, . . . , NM−1 and old model parameters, $\hat{A}_{1,R}, \hat{\theta}_{1,R}, \hat{A}_{2,R}, \hat{\theta}_{2,R}, \hat{A}_{3,R}, \hat{\theta}_{3,R}$. The online parameter estimation process can update amplitude and phase model parameters to provide new parameters $\hat{A}_{1,R,new}, \hat{\theta}_{1,R,new}, \hat{A}_{2,R,new}, \hat{\theta}_{2,R,new}, \hat{A}_{3,R,new}, \hat{\theta}_{3,R,new}$ for a sinusoidal harmonic RRO model.

At 1205, the process rotates the disk for P wedges along track with radius R. At 1210, the process activates a loop-filter-enabled clock frequency synchronization and a model-based predictor. At 1215, the process records the PLL loop filter output at each wedge to acquire P measurements, which can be denoted by $\Delta \tilde{L}''_{m,R}$, $m=m_0, m_0+1, \ldots, m_0+P-1$. The measurements are approximately equal to $$\Delta \tilde{L}''_{m,R} \approx L_R^{(0)} \frac{2\pi}{M} \begin{bmatrix} \Delta A_{1,R} \sin\left(\frac{2\pi}{M}m + \Delta\theta_{1,R}\right) + \\ 2\Delta A_{2,R} \sin\left(\frac{4\pi}{M}m + \Delta\theta_{2,R}\right) + \\ 3\Delta A_{3,R} \sin\left(\frac{6\pi}{M}m + \Delta\theta_{3,R}\right) \end{bmatrix}.$$

At 1220, the process estimates RRO model parameters. In some implementations, the process estimate RRO model parameter changes based on:

$$\Delta\hat{\theta}_{i,R} = \tan^{-1}\left(\frac{\sum_{m=m_0}^{m_0+P-1} y(m)\cos\left(\frac{2\pi mi}{M}\right)}{\sum_{m=m_0}^{m_0+P-1} y(m)\sin\left(\frac{2\pi mi}{M}\right)}\right)$$

$$\hat{A}_{i,R} = \frac{\sum_{m=m_0}^{m_0+P-1} y(m)\sin\left(\frac{2\pi mi}{M} + \Delta\hat{\theta}_{i,R}\right)}{i \sum_{m=m_0}^{m_0+P-1} \sin^2\left(\frac{2\pi mi}{M} + \Delta\hat{\theta}_{i,R}\right)}, i = 1, 2, 3$$

where $$y(m) = \frac{M \Delta \tilde{L}''_{m,R}}{2\pi L_R^{(0)}}.$$

At 1225, model parameters are updated based on the changes. In some implementations, the process updates model parameters according to $$\hat{A}_{i,R,new} = \sqrt{\hat{A}_{i,R}^2 + \Delta\hat{A}_{i,R}^2 + 2\hat{A}_{i,R}\Delta\hat{A}_{i,R}\cos(\hat{\theta}_{i,R} - \Delta\hat{\theta}_{i,R})}$$

$$\hat{\theta}_{i,R,new} = \tan^{-1}\left(\frac{\hat{A}_{i,R}\sin\hat{\theta}_{i,R} + \Delta\hat{A}_{i,R}\sin\Delta\hat{\theta}_{i,R}}{\hat{A}_{i,R}\cos\hat{\theta}_{i,R} + \Delta\hat{A}_{i,R}\cos\Delta\hat{\theta}_{i,R}}\right), i = 1, 2, 3.$$

In some implementations, the process can determine parameter estimates, e.g., $\hat{A}_{1,R_k}, \hat{\theta}_{1,R_k}, \hat{A}_{2,R_k}, \hat{\theta}_{2,R_k}, \hat{A}_{3,R_k}, \hat{\theta}_{3,R_k}$ for several radii $R_k$ based on linear interpolation. The process can determine parameter estimates based on $$\hat{A}_{i,R} = \frac{R_{k2} - R}{R_{k2} - R_{k1}} \hat{A}_{i,R_{k1}} + \frac{R - R_{k1}}{R_{k2} - R_{k1}} \hat{A}_{i,R_{k2}}$$

$$\hat{\theta}_{i,R} = \frac{R_{k2} - R}{R_{k2} - R_{k1}} \hat{\theta}_{i,R_{k1}} + \frac{R - R_{k1}}{R_{k2} - R_{k1}} \hat{\theta}_{i,R_{k2}}, i = 1, 2, 3$$

If parameter estimates for one radius, e.g., $\hat{A}_{1,R_0}, \hat{\theta}_{1,R_0}, \hat{A}_{2,R_0}, \hat{\theta}_{2,R_0}, \hat{A}_{3,R_0}, \hat{\theta}_{3,R_0}$, can be determined, then parameter estimates for a different radius R can be derived from a disk slip model. For example, $$A_{1,R} \approx \hat{A}_{1,R_0} \frac{R_0}{R}, A_{2,R} \approx \hat{A}_{i,R_0} \frac{R_0^2}{R^2}, A_{3,R} \approx \hat{A}_{3,R_0} \frac{R_0^3}{R^3}$$

and $$\hat{\theta}_{1,R} = \hat{\theta}_{1,R_0}, \hat{\theta}_{2,R} = \hat{\theta}_{2,R_0}, \hat{\theta}_{3,R} = \hat{\theta}_{3,R_0}.$$

Figure 13:
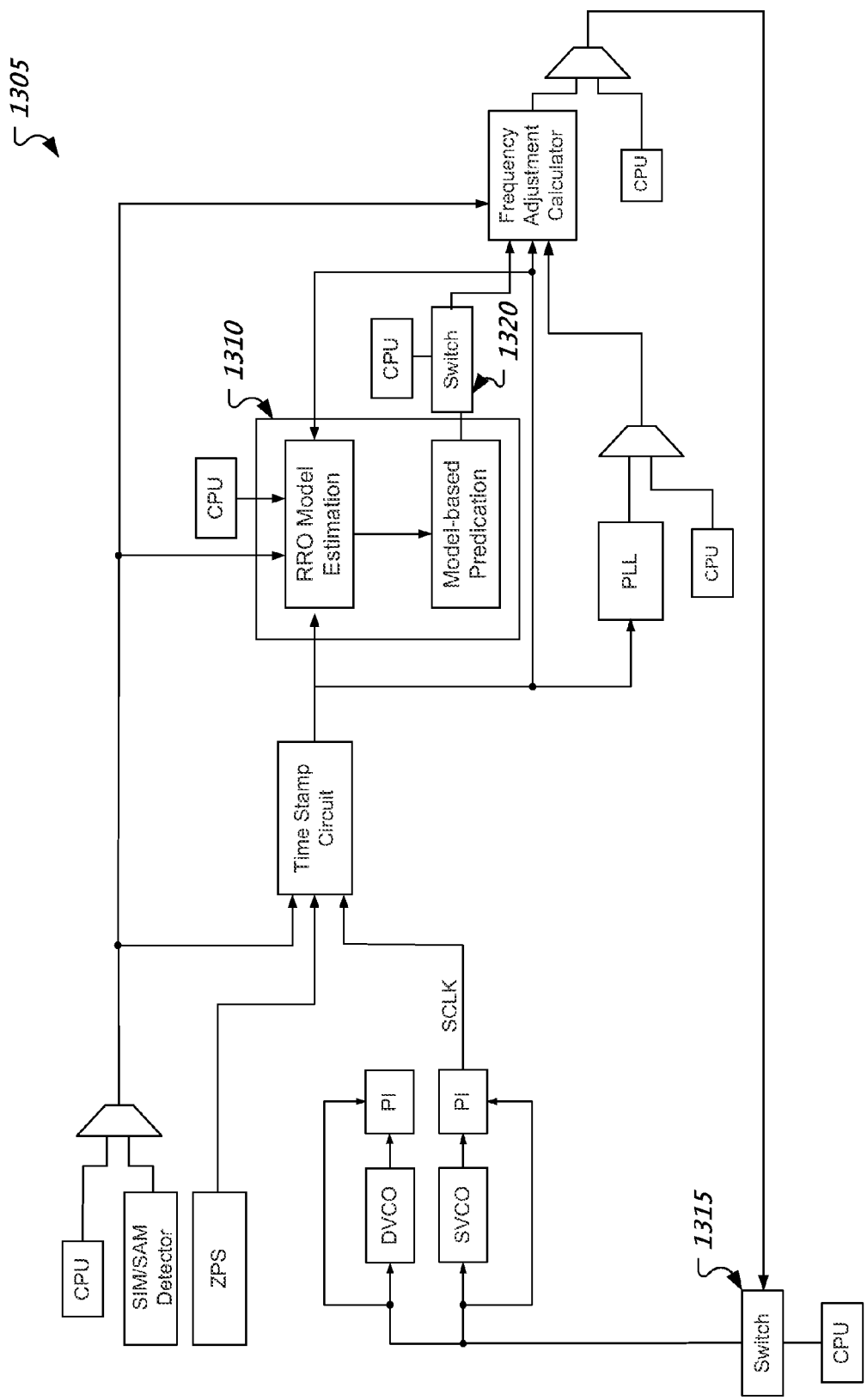
FIG. 13 shows an example of a disk synchronous write architecture.

FIG. 13 shows an example of a disk synchronous write architecture. Synchronization techniques and systems such as a disk synchronous write (DSW) architecture 1305 can provide precise write-clock synchronization for bit-patterned media. Precise clock synchronization can also mitigate the burden to a timing loop on the read side, especially for a low signal-to-noise ratio (SNR) channel such as one associated with continuous media. A DSW architecture can include one or more model-based techniques to reduce or eliminate RRO and a PLL to suppress NRRO. A DSW architecture 1305 can adjust clock frequencies based on the output of a model-based predictor and a PLL to reduce timing errors. A DSW architecture 1305 can adaptively track variations of the model parameters and provide updates to the model parameters. Various models for RRO error component include models that use sinusoidal functions to represent RRO components, models that represent RRO components as a periodic function of a fundamental frequency based on tracking RRO components at each servo wedge, and models based on combinations thereof. Based on compensating for RRO, PLL coefficients can be optimized for processing NRRO low-frequency components.

A disk drive system controller circuitry such as a CPU can include one or more processors configured to load and run firmware from one or more memories in a disk drive system. Firmware can include a software program to estimate RRO model parameters. The firmware can include a software program to make model-based predications based on the estimated RRO model parameters.

Controller circuitry such as a CPU can provide inputs to various components of the disk synchronous write architecture 1305. In addition, the CPU can control various flows of information within the DSW architecture 1305. The CPU can operate a switch 1315 to turn on or off closed loop DSW control. The CPU can operate another switch 1320 to turn on or off model based compensation. Controller circuitry can include a processor module 1310 configured to execute a software program to make model-based predications based on the estimated RRO model parameters. In some implementations, a processor module 1310 can include a CPU.

A DSW architecture 1305 uses a time stamp circuit to count the number of servo clock pulses between adjacent servo wedges. Input to a time stamp circuit in a DSW architecture 1305 can include a servo wedge and track identifiers via a SIM/SAM detector, an output from a zero phase shift (ZPS) module, and a servo clock signal (SCLK signal) produced by a servo VCO (SVCO). The ZPS module can provide a 1/32 bit-period resolution for the clock count.

Figure 14:
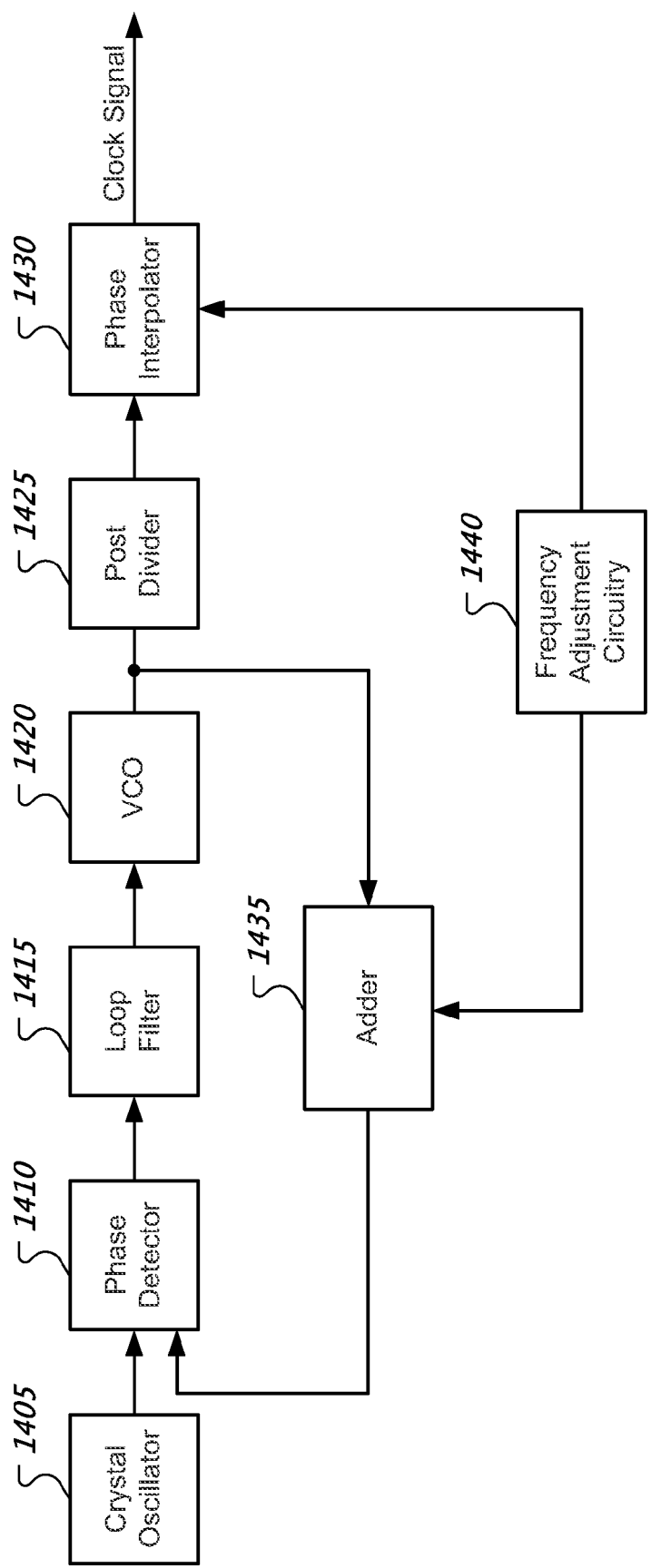
FIG. 14 shows an example of a voltage controlled oscillator frequency updating architecture.

FIG. 14 shows an example of a voltage controlled oscillator frequency updating architecture. An updating architecture can include a crystal oscillator 1405, a phase detector 1410, a loop filter 1415, a VCO 1420, a post divider 1425, a phase interpolator 1430 that produces a clock signal, an adder 1435, and a frequency adjustment circuitry 1440. In some implementations, the crystal oscillator 1405 oscillates at 20 MHz. The frequency adjustment circuitry 1440 can adjust an output of the VCO 1420 via the adder 1435. In some implementations, the adder 1435 can add an output of the frequency adjustment circuitry 1440 and an output of the VCO 1420 to produce a signal that is provided to the phase detector 1410. The VCO 1420 is coupled with the phase detector 1410 via the loop filter 1415. The frequency adjustment circuitry 1440 can adjust the phase interpolator 1430. VCO adjustments can cause a transient response. The phase interpolator 1430 can reduce or eliminate transient responses.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method comprising:
 generating timing data based on a clock signal and a waveform produced by a head operated with respect to a magnetic rotating recording medium and the clock signal, the rotating recording medium comprising multiple servo wedges arranged on multiple tracks, wherein the timing data comprise information based on a measurement of clock pulses of the clock signal between two servo wedges as indicated by the waveform;
 determining model parameters based on the timing data to model and predict deterministic disturbances associated with the rotating recording medium;
 determining a first frequency offset, based on one or more of the model parameters, to compensate for one or more of the deterministic disturbances in an area of the rotating recording medium situated between two servo wedges;
 determining a second frequency offset to compensate for one or more nondeterministic disturbances in the area, wherein determining the second frequency offset comprises using a frequency adjustment produced by a loop filter operated on the timing data;
 determining a clock adjustment based on the first frequency offset and the second frequency offset; and
 adjusting a clock frequency based on the clock adjustment to read or write data within the area.

2. The method of claim 1, wherein determining the clock adjustment comprises determining multiple clock frequency adjustments for multiple adjacent sub-regions of a region on a track, wherein the region is situated between a first servo wedge on the track and a second servo wedge on the track, wherein the clock frequency adjustments are determined for the sub-regions, respectively,
 wherein adjusting the clock frequency comprises performing multiple adjustments to the clock frequency based on the clock frequency adjustments, respectively, during a passage of the head over the adjacent sub-regions.

3. The method of claim 1, wherein determining model parameters based on the timing data comprises using one or more sinusoidal functions to model the one or more deterministic disturbances, wherein the model parameters comprise one or more sinusoidal harmonic amplitude parameters and one or more sinusoidal harmonic phase parameters.

4. The method of claim 1, wherein determining model parameters based on the timing data comprises using one or more periodic functions to model the one or more deterministic disturbances, wherein the model parameters comprise two or more periodic timing components associated with two or more servo wedges, respectively.

5. The method of claim 1, wherein determining model parameters based on the timing data comprises using one or more frequency adjustments produced by the loop filter.

6. The method of claim 1, further comprising:
 updating the model parameters based on one or more frequency adjustments produced by the loop filter.

7. The method of claim 1, wherein determining the first frequency offset comprises:
 determining repeatable run-out components along a track of the rotating recording medium by using a sinusoidal function model with one or more estimated model parameters; and performing an interpolation of one or more periodic timing components at servo wedges for areas between consecutive servo wedges on the track.

8. The method of claim 1, wherein determining the first frequency offset comprises:
identifying a sub-region of a region on the track situated between a first servo wedge on the track and a second servo wedge on the track, wherein the region comprises multiple sub-regions; and
predicting a repeatable run-out frequency offset for the identified sub-region based on the interpolation.

9. An apparatus comprising:
circuitry configured to generate timing data based on a clock signal and a waveform produced by a head operated with respect to a magnetic rotating recording medium and the clock signal, the rotating recording medium comprising multiple servo wedges arranged on multiple tracks, wherein the timing data comprises information based on a measurement of clock pulses of the clock signal between two servo wedges as indicated by the waveform;
controller circuitry configured to determine model parameters based on the timing data to model deterministic disturbances associated with the rotating recording medium, determine a first frequency offset based on one or more of the model parameters to predict and compensate for one or more of the deterministic disturbances in an area of the rotating recording medium situated between two servo wedges, and determine a second frequency offset to compensate for one or more nondeterministic disturbances in the area;
circuitry configured to determine a clock adjustment based on the first frequency offset and the second frequency offset; and
circuitry configured to adjust a clock frequency based on the clock adjustment.

10. The apparatus of claim 9, wherein the controller circuitry is configured to determine multiple clock frequency adjustments for multiple adjacent sub-regions of a region on a track, wherein the region is situated between a first servo wedge on the track and a second servo wedge on the track, wherein the clock frequency adjustments are determined for the sub-regions, respectively,
wherein the controller circuitry is configured to perform multiple adjustments to the clock signal based on the clock adjustments, respectively, during a passage of the head over the adjacent sub-regions.

11. The apparatus of claim 9, wherein the controller circuitry is configured to use one or more sinusoidal functions to model the one or more deterministic disturbances, wherein the model parameters comprise one or more sinusoidal harmonic amplitude parameters and one or more sinusoidal harmonic phase parameters.

12. The apparatus of claim 9, wherein the controller circuitry is use one or more periodic functions to model the one or more deterministic disturbances, wherein the model parameters comprise two or more periodic timing components associated with two or more servo wedges, respectively.

13. The apparatus of claim 9, comprising:
a loop filter configured to operate based on the timing data to produce frequency adjustments,
wherein the controller circuitry is configured to receive information indicative of the frequency adjustments, and determine the model parameters based on the timing data and the phase adjustments, wherein the recording medium comprises a bit-pattern medium that defines separated bit positions on a track.

14. The apparatus of claim 9, further comprising:
a loop filter configured to operate based on the timing data to produce frequency adjustments,
wherein the controller circuitry is configured to update the model parameters using at least one of the frequency adjustments.

15. The apparatus of claim 9, wherein the controller circuitry is configured to determine repeatable run-out components at multiple servo wedges situated on a track of the rotating recording medium, and
wherein the controller circuitry is configured to perform an interpolation of the repeatable run-out components to model repeatable run-out components for areas between the multiple servo wedges on the track.

16. The apparatus of claim 15, wherein the controller circuitry is configured to identify a sub-region of a region on the track situated between a first servo wedge on the track and a second servo wedge on the track, wherein the region comprises multiple sub-regions; and
wherein the controller circuitry is configured to predict a repeatable run-out frequency offset for the identified sub-region based on the interpolation.

17. A system comprising:
a magnetic rotatable recording medium that includes multiple servo wedges arranged on multiple tracks;
a drive head to read and write data to the rotatable recording medium;
a motor to rotate the rotatable recording medium;
a time stamp circuit configured to generate timing data based on a clock signal and a waveform produced by the drive head operated with respect to the rotatable recording medium and the clock signal, wherein the timing data comprises information based on a measurement of clock pulses of the clock signal between two servo wedges as indicated by the waveform;
a controller configured to determine model parameters based on the timing data to model deterministic disturbances associated with the rotatable recording medium, determine a first frequency offset based on one or more of the model parameters to predict and compensate for one or more of the deterministic disturbances in an area of the rotatable recording medium situated between two servo wedges, and determine a second frequency offset to compensate for one or more nondeterministic disturbances in the area;
a frequency adjustment calculator configured to determine a clock adjustment based on the first frequency offset and the second frequency offset; and
circuitry configured to adjust a clock frequency based on the clock adjustment.

18. The system of claim 17, wherein the controller is configured to estimate one or more amplitudes of one or more sinusoidal harmonics, respectively, and to estimate one or more phases of the one or more sinusoidal harmonics, respectively, wherein the model parameters comprise the one or more amplitudes and the one or more phases.

19. The system of claim 17, wherein the controller is configured to determine repeatable run-out components at multiple servo wedges situated on a track of the rotatable recording medium, and
wherein the controller is configured to perform an interpolation of the repeatable run-out components to model repeatable run-out components for areas between the multiple servo wedges on the track.

20. The system of claim 17, wherein the rotatable recording medium comprises a bit-pattern medium that defines separated bit positions on a track, wherein the controller is configured to repeatedly update the clock frequency during a passage of the drive head between a first servo wedge on the track and a second servo wedge on the track to write data to one or more of the separated bit positions.

* * * * *